(12) United States Patent
Chun et al.

(10) Patent No.: US 11,076,206 B2
(45) Date of Patent: Jul. 27, 2021

(54) APPARATUS AND METHOD FOR MANUFACTURING VIEWER-RELATION TYPE VIDEO

(71) Applicant: JAM2GO, INC., Seoul (KR)

(72) Inventors: Sol Jee Chun, Seoul (KR); Seung Hyun Ha, Seoul (KR)

(73) Assignee: Jong Yoong Chun

( * ) Notice: Subject to any disclaimer, the term of this patent is extended or adjusted under 35 U.S.C. 154(b) by 167 days.

(21) Appl. No.: 15/741,461

(22) PCT Filed: Jul. 4, 2016

(86) PCT No.: PCT/KR2016/007199
§ 371 (c)(1),
(2) Date: Jan. 2, 2018

(87) PCT Pub. No.: WO2017/007206
PCT Pub. Date: Jan. 12, 2017

(65) Prior Publication Data
US 2018/0376224 A1 Dec. 27, 2018

(30) Foreign Application Priority Data
Jul. 3, 2015 (KR) .................. 10-2015-0095595
Jul. 28, 2015 (KR) .................. 10-2015-0106557

(51) Int. Cl.
*H04N 21/85* (2011.01)
*H04N 21/234* (2011.01)
(Continued)

(52) U.S. Cl.
CPC ............ *H04N 21/85* (2013.01); *G06F 16/58* (2019.01); *H04N 21/23418* (2013.01);
(Continued)

(58) Field of Classification Search
CPC ..... H04N 21/23418; H04N 21/234318; H04N 21/85; H04N 21/25891; H04N 21/2668;
(Continued)

(56) References Cited

U.S. PATENT DOCUMENTS

| 8,934,661 B2 | 1/2015 | Dolson et al. |
| 9,112,926 B2 | 8/2015 | Kerger et al. |

(Continued)

FOREIGN PATENT DOCUMENTS

| JP | 2004537190 A | 12/2004 |
| KR | 20120061110 A | 6/2012 |

(Continued)

OTHER PUBLICATIONS

International Search Report (in Korean and English) and Written Opinion (in Korean) issued in PCT/KR2016/007199, dated Sep. 30, 2016; ISA/KR.

(Continued)

*Primary Examiner* — Pinkal R Chokshi
(74) *Attorney, Agent, or Firm* — Harness, Dickey & Pierce, P.L.C.

(57) ABSTRACT

The present invention relates to an apparatus and a method for manufacturing a viewer-relation type video and, more particularly, to an apparatus and a method for manufacturing a viewer relation-type video which can compose received videos according to a relationship with a viewer and provide the composed videos to the viewer.

24 Claims, 13 Drawing Sheets

(51) Int. Cl.
*H04N 21/258* (2011.01)
*H04N 21/854* (2011.01)
*H04N 21/2343* (2011.01)
*H04N 21/658* (2011.01)
*H04N 21/2668* (2011.01)
*G06F 16/58* (2019.01)
*H04N 21/45* (2011.01)
*H04N 21/81* (2011.01)

(52) U.S. Cl.
CPC ........... *H04N 21/234318* (2013.01); *H04N 21/25891* (2013.01); *H04N 21/2668* (2013.01); *H04N 21/4532* (2013.01); *H04N 21/658* (2013.01); *H04N 21/812* (2013.01); *H04N 21/854* (2013.01)

(58) Field of Classification Search
CPC ............ H04N 21/4532; H04N 21/658; H04N 21/812; H04N 21/854
See application file for complete search history.

(56) References Cited

U.S. PATENT DOCUMENTS

| | | | |
|---|---|---|---|
| 2002/0152117 A1* | 10/2002 | Cristofalo | G06Q 30/02 705/14.52 |
| 2009/0310819 A1* | 12/2009 | Hatano | G06F 21/32 382/100 |
| 2010/0141578 A1* | 6/2010 | Horiuchi | H04N 21/42204 345/158 |
| 2010/0262992 A1 | 10/2010 | Casagrande | |
| 2012/0098859 A1 | 4/2012 | Lee et al. | |
| 2012/0327119 A1* | 12/2012 | Woo | G06F 16/435 345/633 |
| 2013/0101219 A1* | 4/2013 | Bosworth | H04N 21/44008 382/195 |
| 2013/0198766 A1* | 8/2013 | Yoon | H04N 21/47 725/12 |
| 2014/0025660 A1* | 1/2014 | Mohammed | G06Q 30/0251 707/722 |
| 2014/0298383 A1 | 10/2014 | Jo et al. | |
| 2015/0067538 A1* | 3/2015 | Lee | G06F 9/451 715/753 |
| 2015/0085114 A1* | 3/2015 | Ptitsyn | H04N 7/183 348/143 |
| 2016/0034763 A1* | 2/2016 | Takanaka | G06K 9/00751 386/241 |

FOREIGN PATENT DOCUMENTS

| | | |
|---|---|---|
| KR | 20130000160 A | 1/2013 |
| KR | 20140118604 A | 10/2014 |
| KR | 20150026727 A | 3/2015 |
| WO | 9926415 A1 | 5/1999 |

OTHER PUBLICATIONS

European Search Report issued in European Patent Application No. 16821612.5 dated Oct. 23, 2018 (8 pages).

* cited by examiner

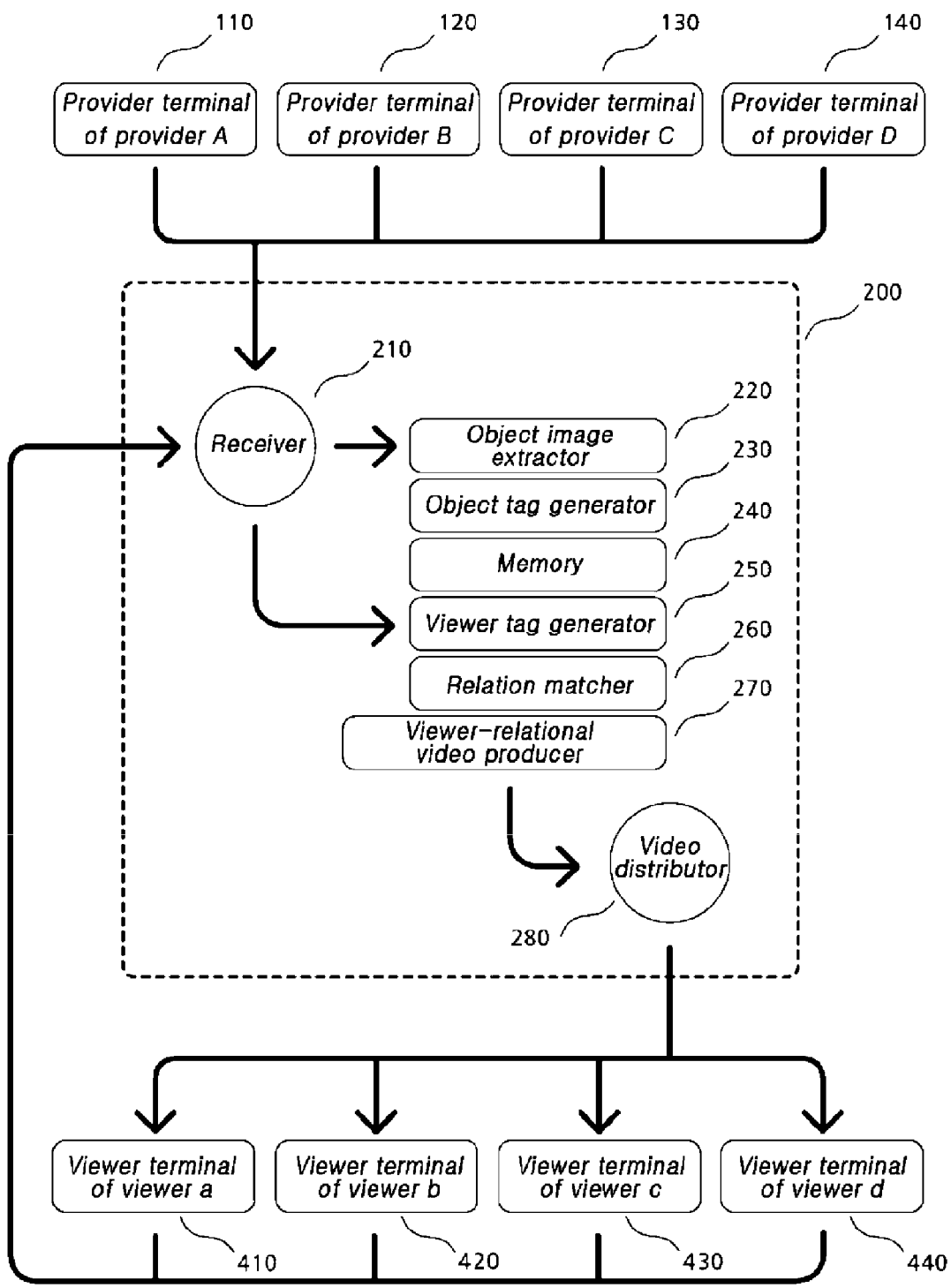

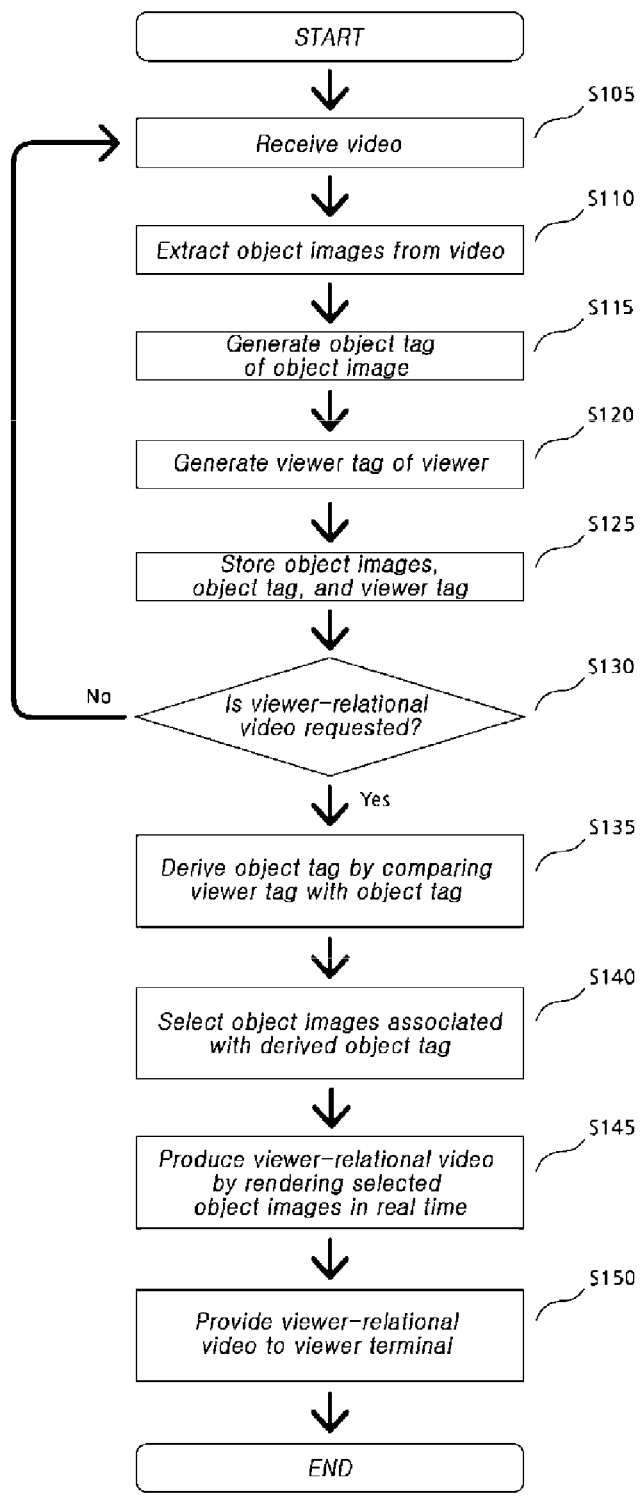

FIG.5

| Object tag | Object image 001 | Object image 002 | Object image 003 | Object image 004 |
|---|---|---|---|---|
| Provider | Provider A | Provider B | Provider C | Provider D |
| Performer | Provider A | Provider B | Provider C | Provider D |
| Video genre | Song | Song | Song | Song |
| Reproducing time | 3:11 | 3:11 | 3:11 | 3:11 |
| File format | Mp4 | Mp4 | Mp4 | Mp4 |
| Event No. | 08 | 08 | 08 | 08 |
| Provider information | | | | |
| Social relationship | Viewer b | Viewer a | Viewer a | Viewer a |
| | Viewer c | Viewer b | Viewer c | Viewer b |
| | null | Viewer c | null | Viewer d |
| Residence | Korea | U.S.A. | Korea | Australia |
| | Seoul | New York | Busan | Sydney |
| Desired genre | Song | Song | Song | Performance |
| Sex | Female | Female | Male | Male |
| Age | Twenties | Thirties | Twenties | Thirties |

FIG.6

| Viewer tag | Viewer a | Viewer b | Viewer c | Viewer d |
|---|---|---|---|---|
| Social relationship | Provider G | Provider A | Provider A | Provider D |
| | Provider B | Provider B | Provider B | null |
| | Provider C | Provider D | Provider C | null |
| Residence | Korea | UK | Japan | Australia |
| | Seoul | London | Tokyo | Sydney |
| Desired genre | Song | Magic | Gag | Performance |
| | Performance | Song | Song | Song |
| Sex | Male | Female | Male | Female |
| Age | Twenties | Thirties | Thirties | Thirties |

FIG.10
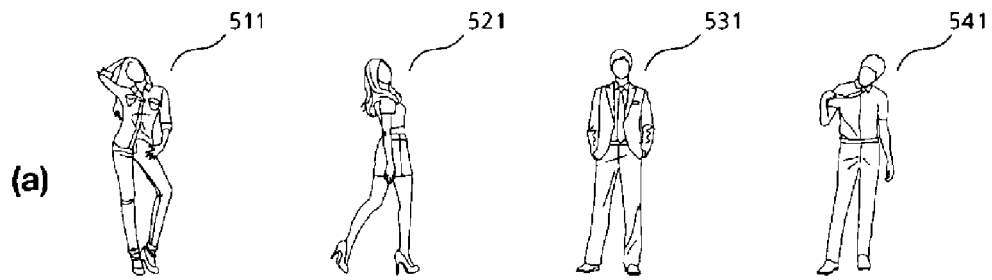
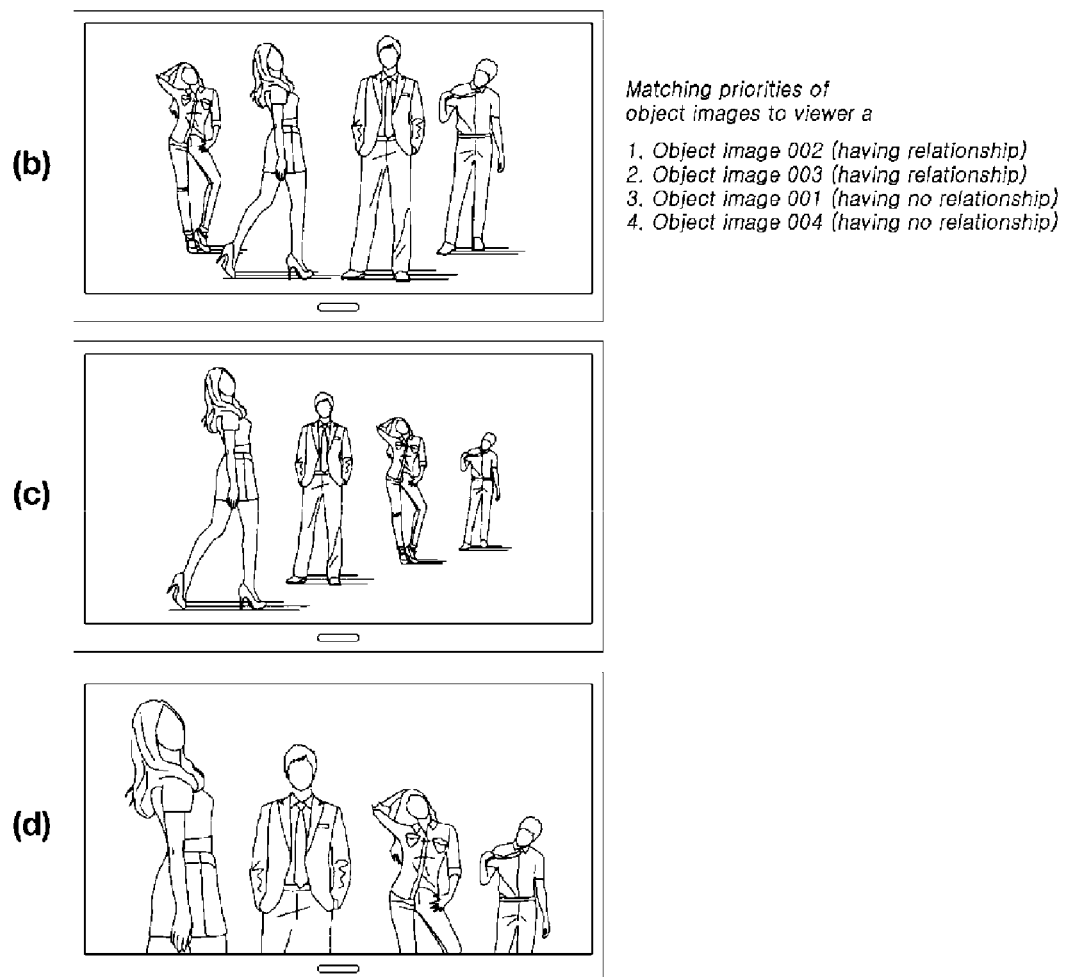

FIG.11

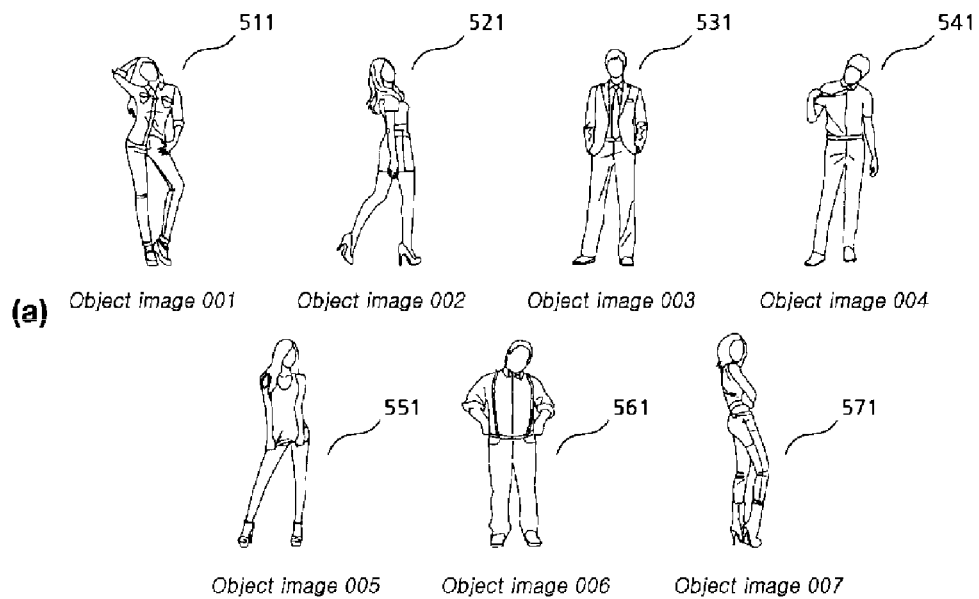

(a)

Object image 001  Object image 002  Object image 003  Object image 004

Object image 005  Object image 006  Object image 007

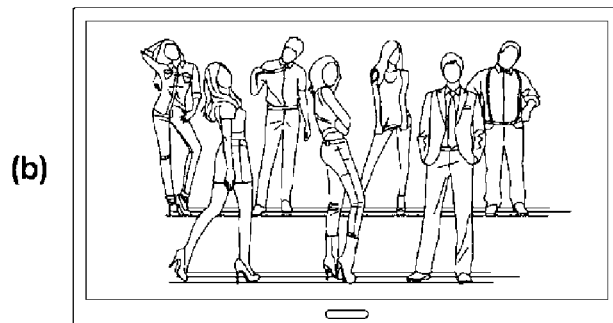

(b)

Matching priorities of object images to viewer a

1. Object image 007 (having relationship)
2. Object image 002 (having relationship)
3. Object image 003 (having relationship)
4. Object image 001 (having relationship)
5. Object image 004 (having relationship)
6. Object image 005 (having no relationship)
7. Object image 006 (having no relationship)

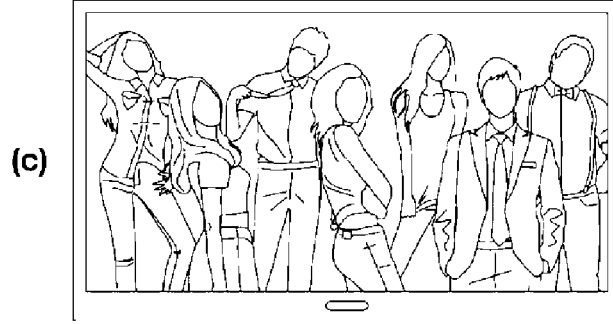

| Viewer tag weights | | Viewer a | | | |
|---|---|---|---|---|---|
| | | Provider A | Provider B | Provider C | Provider D |
| Social relationship 3 | | 0 | 3 | 3 | 0 |
| Residence | Country 1 | 1 | 0 | 1 | 0 |
| | City 2 | 2 | 0 | 0 | 0 |
| Desired genre 1 | | 1 | 1 | 1 | 1 |
| Sex 1 | | 0 | 0 | 1 | 1 |
| Age 2 | | 2 | 0 | 2 | 0 |
| Total 10 | | 6 | 4 | 8 | 2 |

APPARATUS AND METHOD FOR MANUFACTURING VIEWER-RELATION TYPE VIDEO

TECHNICAL FIELD

The present invention relates to a viewer-relational video producing device and a producing method thereof and, more particularly, to a viewer-relational video producing device for composing received videos depending on a relationship with a viewer and for providing the same to the viewer, and a producing method thereof.

BACKGROUND ART

According to a conventional method for providing video contents, a viewer is provided with desired video contents by selecting video contents produced for various purposes, such as broadcasting, education, and advertisement, and by selecting various receiving methods, such as terrestrial broadcasting reception, cable broadcasting reception, or an Internet video search service.

According to such a conventional method, the viewer can only select a desired video from among the ready-produced videos, and cannot be provided with a video that is personalized by reconfiguring the content of the video to suit the user's desires.

U.S. Patent Application Publication No. 2010/0262992 (Prior Art 1), published on Oct. 14, 2010, discloses a technique for solving such a problem. In Prior Art 1, various kinds of second contents are transmitted while being superimposed onto first contents produced to be provided to all content-consumers. At this time, the superimposed second contents are selected depending on the attributes of the identified content-consumer, and the second contents selected depending on the attributes of the respective content-consumers are superimposed onto the first contents and then are transmitted to the corresponding content-consumer.

Accordingly, Prior Art 1 allows the content-consumer to be provided with the second contents selected based on the attributes of the content-consumer from among the classified second contents because the second contents selected by reflecting the attributes of the content-consumer are transmitted to the corresponding content-consumer while being superimposed onto the first contents transmitted through broadcasting signals.

However, although the second contents in Prior Art 1 include information customized to a specific content-consumer, the second contents are merely ancillary contents. Furthermore, since the surrounding first contents are common contents to be provided to all of the content-users, there is a problem in which the satisfaction, the suitability, the preference, and the relevance of the content-consumer with respect to the first contents are not considered at all.

U.S. Pat. No. 9,112,926 (Prior Art 2), registered on Aug. 18, 2015, discloses a technique for recommending contents according to the attributes of content-consumers. In Prior Art 2, attributes are assigned to the respective content-consumers. In this case, when a first content-consumer and a second content-consumer are selected as content-consumers having similar attributes, and if there are contents that have been consumed by the second content-consumer but not consumed by the first content-consumer, the corresponding contents are recommended to the first content-consumer.

That is, Prior Art 2 disclosed a technique for recommending the contents to the content-consumers having similar attributes, which are consumed thereby, and Prior Art 2 may be superior to Prior Art 1 in terms of the satisfaction and the suitability of the recommended contents for the content-consumers.

However, according to Prior Art 2, only the ready-produced contents are recommended and provided depending on the attributes of the content-consumers, and new contents cannot be generated or edited and provided by reflecting the attributes of the content-consumers, so that the content-consumers cannot be provided with a unique content customized thereto.

U.S. Pat. No. 8,934,661 (Prior Art 3), published on Jan. 13, 2015, discloses a photo album creation technique based on social information. Prior Art 3 relates to a photo-curation technique using social networks, wherein a plurality of photographs and information about objects in the photographs included in the social networking system are stored. Thereafter, when a content-consumer accesses the corresponding social networking system, the photographs and information about the objects are analyzed and scores for the photographs are calculated, thereby curating and providing only the photographs associated with the content-consumer connected to the social networking system.

That is, since the contents (photographs) suitable for the content-consumer are extracted and provided according to the social information of the content-consumer in Prior Art 3, the content-consumer can enjoy a high level of convenience, satisfaction, and suitability in consuming the contents.

However, according to Prior Art 3, the ready-produced contents are merely selected and provided using the social networking information of the content-consumer. That is, since the ready-produced contents are merely provided without being newly processed (edited) according to the social networking information of the content-consumer, the content-consumer cannot be provided with personalized contents that are customized thereto.

DETAILED DESCRIPTION OF THE INVENTION

Technical Problem

The present invention has been made in order to solve the problems above, and an objective of the present invention is to provide a viewer-relational video producing device for receiving contents from content providers and for producing (editing) new contents from some of the received contents to thus provide the same to a viewer when the viewer requests the contents to be provided, and is to further provide a producing method thereof.

Another objective of the present invention is to provide a viewer-relational video producing device for selecting personal object images of contents of which the content information matches viewer information from among the contents from which personal object images are extracted and for producing new contents using the selected personal object images to thus provide the same to a viewer so that the viewer can be provided with optimal contents, and is to further provide a producing method thereof.

Another objective of the present invention is to provide a viewer-relational video producing device for extracting personal object images from contents and for producing new contents by selecting and editing the personal object images matching viewer information to thus provide the same to a viewer, and is to further provide a producing method thereof.

Another objective of the present invention is to provide a viewer-relational video producing device for comparing personal information of contents, among content information of the contents transmitted by a provider, with social relationship information of a viewer, for selecting contents of the personal information that matches the social relationship information of the viewer, and for producing new contents using one or more selected contents to thus provide the same to the viewer, and is to further provide a producing method thereof.

Another objective of the present invention is to provide a viewer-relational video producing device for assigning weights to the respective information of the personal object images included in the newly produced contents in order for the viewer to focus on the contents, for calculating the sum of the weights of the personal object images selected according to the social relationship information of a viewer, and for producing contents by adjusting the allocation of layers to the personal object images and the sizes of the personal object images to be different from each other depending on the calculated weights in the produced contents, and is to further provide a producing method thereof.

Another objective of the present invention is to provide a viewer-relational video producing device for, in producing new contents by editing the contents, which are selected according to the comparison of personal information of a plurality of contents with social relationship information of a viewer, together with other personal object images, selecting one or more contents according to the weight of the corresponding social relationship information and for using the selected contents as a background image of the new contents, and is to further provide a producing method thereof.

Another objective of the present invention is to provide a viewer-relational video producing device for, when request information for contents is received from a viewer, preferentially selecting personal object images that match the social relationship information contained in the request information and for including the same in the newly produced contents, and is to further provide a producing method thereof.

Technical Solution

In order to attain the objectives above, a viewer-relational video producing device, according to the present invention, may comprise: a receiver configured to receive videos from one or more provider terminals, and configured to receive request signals for a viewer-relational video from the viewer terminals; an object image extractor configured to extract personal object images from the videos; an object tag generator configured to generate object tags of the personal object images using each video metadata including personal information for each video; a viewer tag generator configured to generate viewer tags using each viewer metadata including social relationship information for each viewer; a storage configured to store the personal object images, the object tags, and the viewer tags; a relation matcher configured to compare social relationship information of the viewer tag corresponding to the viewer of the viewer terminal, among the viewer tags stored in the storage, with the respective personal information of the object tags stored in the storage when the receiver receives the request signal, and configured to retrieve one or more object tags matching the viewer tag according to the comparison in order to thereby generate viewer relationship information; a viewer-relational video producer configured to select one or more personal object images associated with the viewer relationship information from among the personal object images stored in the storage, and configured to compose the one or more selected personal object images to thus produce a viewer-relational video including the same; and a viewer-relational video distributor configured to provide the produced viewer-relational video to the viewer terminal.

In the viewer-relational video producing device according to the embodiment of the present invention, the storage may further store the videos received by the receiver.

In the viewer-relational video producing device according to the embodiment of the present invention, the viewer-relational video producer may further select and perform the step of composing one or more videos associated with the viewer relationship information generated by the relation matcher from among the videos stored in the storage, and the one or more videos may be used as a background video of the viewer-relational video.

In the viewer-relational video producing device according to the embodiment of the present invention, the viewer tag generator may generate the viewer tags including a plurality of items and may give weights to the plurality of items such that the social relationship information is given a high weight.

In the viewer-relational video producing device according to the embodiment of the present invention, the relation matcher may calculate matching priorities of the object tags using the sum of weights applied to the items matching the object tag, among the plurality of items of the viewer tags.

In the viewer-relational video producing device according to the embodiment of the present invention, the viewer-relational video producer may generate the viewer-relational video by selecting the personal object images associated with the object tags of which the matching priorities are within a threshold range.

In the viewer-relational video producing device according to the embodiment of the present invention, the viewer-relational video producer may allocate layers to the respective personal object images displayed in the viewer-relational video screen to correspond to the matching priorities of the object tags.

In the viewer-relational video producing device according to the embodiment of the present invention, the viewer-relational video producer may determine display positions of the personal object images using the matching priorities.

In the viewer-relational video producing device according to the embodiment of the present invention, the viewer-relational video producer may adjust the sizes of the respective personal object images to correspond to the display positions of the personal object images.

In the viewer-relational video producing device according to the embodiment of the present invention, if the request signal received from the viewer terminal comprises real-time metadata, the relation matcher may further incorporate the real-time metadata in the viewer metadata corresponding to the viewer of the viewer terminal.

In the viewer-relational video producing device according to the embodiment of the present invention, the relation matcher may compare the viewer tag generated using the real-time metadata corresponding to the viewer of the viewer terminal with the personal information of the object tags stored in the storage, may retrieve one or more object tags matching the viewer tag according to the comparison, and may further comprise the same in the viewer relationship information.

In the viewer-relational video producing device according to the embodiment of the present invention, the viewer-relational video producer may preferentially select one or more personal object images associated with the real-time metadata from among the viewer relationship information, and may produce the viewer-relational video by further including the one or more preferentially selected personal object images.

In the viewer-relational video producing device according to the embodiment of the present invention, the social relationship information of the viewer comprised in the viewer metadata may be provided from a social network service (SNS) of the viewer.

A method for producing a viewer-relational video, according to the present invention, may comprise the steps of: (a) letting a receiver receive videos from one or more provider terminals; (b) letting an object image extractor extract personal object images from the videos; (c) letting an object tag generator generate object tags of the personal object images using each video metadata including personal information for each video; (d) letting a viewer tag generator generate a viewer tag using each viewer metadata including social relationship information for each viewer; (e) letting a storage store the personal object images, the object tags, and the viewer tags; (f) letting a receiver receive a request signal for a viewer-relational video from a viewer terminal; (g) letting a relation matcher compare social relationship information of the viewer tag corresponding to the viewer of the viewer terminal, among the viewer tags stored in the storage, with the respective personal information of the object tags stored in the storage and retrieve one or more object tags matching the viewer tag according to the comparison in order to thereby generate viewer relationship information; (h) letting a viewer-relational video producer select one or more personal object images associated with the viewer relationship information among the personal object images stored in the storage and compose the one or more selected personal object images to thus produce a viewer-relational video including the same; and (i) letting a viewer-relational video distributor provide the produced viewer-relational video to the viewer terminal.

In the method for producing a viewer-relational video according to the embodiment of the present invention, the storage may further store the videos received by the receiver in the step (e).

In the method for producing a viewer-relational video according to the embodiment of the present invention, the viewer-relational video producer may further select and perform the step of composing one or more videos associated with the viewer relationship information generated by the relation matcher from among the videos stored in the storage in the step (h), and the one or more videos may be used as a background video of the viewer-relational video.

In the method for producing a viewer-relational video according to the embodiment of the present invention, the viewer tag generator may generate the viewer tags including a plurality of items and gives weights to the plurality of items such that the social relationship information is given a high weight in the step (d).

In the method for producing a viewer-relational video according to the embodiment of the present invention, the relation matcher may calculate matching priorities of the object tags using the sum of weights applied to the items matching the object tag, among the plurality of items of the viewer tags, in the step (g).

In the method for producing a viewer-relational video according to the embodiment of the present invention, the viewer-relational video producer may generate the viewer-relational video by selecting the personal object images associated with the object tags of which the matching priorities are within a threshold range in the step (h).

In the method for producing a viewer-relational video according to the embodiment of the present invention, the viewer-relational video producer may allocate layers to the respective personal object images displayed in the viewer-relational video screen to correspond to the matching priorities of the object tags in the step (h).

In the method for producing a viewer-relational video according to the embodiment of the present invention, the viewer-relational video producer may determine display positions of the personal object images using the matching priorities in the step (h).

In the method for producing a viewer-relational video according to the embodiment of the present invention, the viewer-relational video producer may adjust the sizes of the respective personal object images to correspond to the display positions of the personal object images in the step (h).

In the method for producing a viewer-relational video according to the embodiment of the present invention, if the request signal received from the viewer terminal includes real-time metadata, the relation matcher may further incorporate the real-time metadata in the viewer metadata corresponding to the viewer of the viewer terminal in the step (f).

In the method for producing a viewer-relational video according to the embodiment of the present invention, the relation matcher may compare the viewer tag generated using the real-time metadata corresponding to the viewer of the viewer terminal with the personal information of the object tags stored in the storage, may retrieve one or more object tags matching the viewer tag according to the comparison, and may further comprise the same in the viewer relationship information in the step (g).

In the method for producing a viewer-relational video according to the embodiment of the present invention, the viewer-relational video producer may preferentially select one or more personal object images associated with the real-time metadata from among the viewer relationship information, and may produce the viewer-relational video by further including the one or more preferentially selected personal object images in the step (h).

In the method for producing a viewer-relational video according to the embodiment of the present invention, the social relationship information of the viewer comprised in the viewer metadata may be provided from a social network service (SNS) of the viewer in the step (g).

Advantageous Effects

According to the present invention having configuration described above, a viewer-relational video producing device and a producing method thereof can give an effect of receiving contents from content providers and producing (editing) new contents using some of the received contents to thus provide the same to a viewer when the viewer requests the contents to be provided.

According to an embodiment of the present invention, a viewer-relational video producing device and a producing method thereof can give another effect of providing a viewer with optimal contents by selecting personal object images of contents of which the content information matches viewer information from among the contents from which personal object images are extracted and by producing new contents using the selected personal object images to thus provide the same to the viewer.

According to another embodiment of the present invention, a viewer-relational video producing device and a producing method thereof can give another effect of extracting personal object images from contents and producing new contents by selecting and editing the personal object images matching viewer information to thus provide the same to the viewer.

According to another embodiment of the present invention, a viewer-relational video producing device and a producing method thereof can give another effect of comparing personal information of contents, among information of the contents transmitted by a provider, with social relationship information of a viewer, selecting the contents of the personal information that matches the social relationship information of the viewer, and producing new contents using one or more selected contents to thus provide the same to the viewer.

According to another embodiment of the present invention, a viewer-relational video producing device and a producing method thereof can give another effect of assigning weights to the respective information of personal object images contained in the newly produced contents in order for the viewer to focus on the contents, calculating the sum of the weights of the personal object images selected according to the social relationship information of the viewer, and producing contents by adjusting the allocation of layers to the personal object images and the sizes of the personal object images to be different from each other depending on the calculated weights in the produced contents.

According to another embodiment of the present invention, a viewer-relational video producing device and a producing method thereof can give another effect of, in producing new contents by editing the contents, which are selected according to the comparison of personal information of a plurality of contents with social relationship information of a viewer, together with other personal object images, selecting one or more contents according to the weight of the corresponding social relationship information and using the selected contents as a background image of the new contents.

Lastly, according to another embodiment of the present invention, a viewer-relational video producing device and a producing method thereof can give an effect of, when request information for requesting contents is received from a viewer, preferentially selecting a personal object image that matches the social relationship information contained in the request information and including the same in the newly produced contents.

BRIEF DESCRIPTION OF THE DRAWINGS

FIG. 3 is a configurational diagram showing a viewer-relational video producing device according to the present invention;

FIG. 4 is a flowchart showing a viewer-relational video producing method according to the present invention;

FIG. 5 is an exemplary diagram showing object tags according to an embodiment of the present invention;

FIG. 6 is an exemplary diagram showing viewer tags according to an embodiment of the present invention;

FIG. 10 is a diagram showing an example of producing a viewer-relational video corresponding to a social relationship of a viewer tag according to an embodiment of the present invention;

FIG. 11 is a diagram showing an example of adjusting the positions and sizes of personal object images associated with object tags matching the viewer tag in a screen of a viewer-relational video based on matching priorities of the object tags according to an embodiment of the present invention;

FIG. 13 is a diagram showing an example of calculating a weight of an object tag matching a viewer tag depending on weights given to the viewer tag according to an embodiment of the present invention.

MODE FOR CARRYING OUT THE INVENTION

Figure 1:
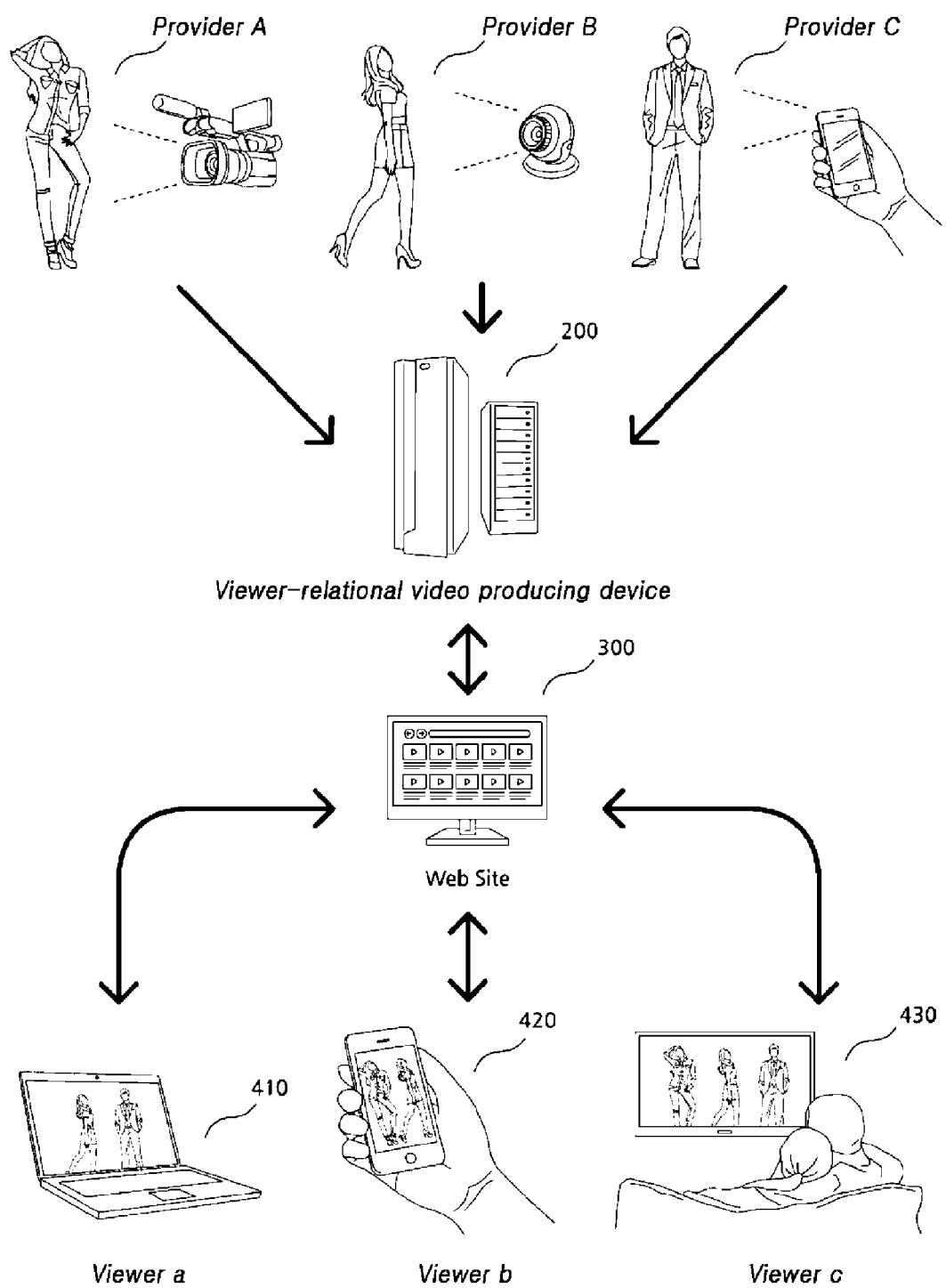
FIG. 1 is a configurational diagram showing the entire outline of the present invention.

The terms or words used in the detailed description and claims should not be limitedly construed as typical meanings or meanings indicated in dictionaries but should be construed as meanings and concepts matching the technical spirit of the present invention based on the principle that the inventor may properly define the concepts of terms in order to describe his or her invention in the best mode.

Thus, since embodiments described in the detailed description and configurations shown in the drawings are only examples and do not cover all the technical spirits of an embodiment, it should be understood that there may be various equivalents and variations that may replace them upon filing the present application.

Furthermore, when it is described in the detailed description that an element comprises (or includes or has) some elements, it should be understood that it may comprise (or include or has) only those elements, or it may comprise (or include or have) other elements as well as those elements if there is no specific limitation. Also, the term 'module', 'unit', 'server' or 'system' in the detailed description means a unit of processing at least one function or operation, and they may be implemented in software, hardware, or a combination thereof and included in a single device or in different devices.

Hereinafter, a preferred embodiment of the present invention will be described in detail with reference to the accompanying drawings.

FIG. 1 is a configurational diagram showing the entire outline of the present invention. As shown in FIG. 1, providers A, B, and C may upload video contents to a viewer-relational video producing device 200 through respective provider terminals (not shown), and viewers a, b, and c may be provided with viewer-relational videos produced in the viewer-relational video producing device 200 using viewer terminals 410, 420, and 430 capable of accessing a website 300.

The respective providers may record videos in various ways. For example, the provider A may record videos using equipment, such as a professional video camera, or the provider B may record videos using a camera provided in a PC or a notebook. In addition, the provider C may record videos using a camera included in a mobile device, of which the photographing quality has recently been improved, at any outdoor place.

Accordingly, the respective providers A, B, and C upload the recorded or stored videos to the viewer-relational video producing device 200 using provider terminals (not shown) capable of accessing the viewer-relational video producing device 200 through a network.

At this time, the videos recorded by the providers may relate to different subjects selected by the respective providers, or may relate to the same subject corresponding to a specific event.

In the case where the videos recorded by the providers relate to different subjects selected by the respective providers, the contents of the videos to be uploaded may differ between the providers. In the case where the videos are recorded for a specific event, the contents of the videos uploaded by the respective providers may be the same while the persons contained in the videos, the backgrounds, and the illumination thereof may be different from each other.

For example, the specific event may be singing a song, and the respective providers may upload videos generated through recording in relation to the corresponding song to the viewer-relational video producing device 200.

Meanwhile, the videos provided by the providers A, B, and C may be recorded using provider terminals (not shown) or using recording equipment separate from the provider terminals, and the recorded videos may be transmitted to the viewer-relational video producing device 200 through the provider terminals (not shown) of the providers A, B, and C. In addition, the videos recorded by the separate recording equipment may be transmitted to the viewer-relational video producing device 200 using the provider terminals (not shown).

In addition, a professional video camera, a camera provided in a PC or a notebook, and a camera of a mobile device, as shown in FIG. 1, may record videos at any indoor or outdoor place.

The viewers a, b, and c may view the videos, which are provided by the viewer-relational video producing device 200 or provided through the website 300 of the viewer-relational video producing device 200, using the viewer terminals 410, 420, and 430. At this time, the videos viewed by the viewers a, b, and c are produced by the viewer-relational video producing device 200 using personal object images associated with object tags matching 'social relationship' information among the viewer tags of the respective viewers a, b, and c.

Figure 2:
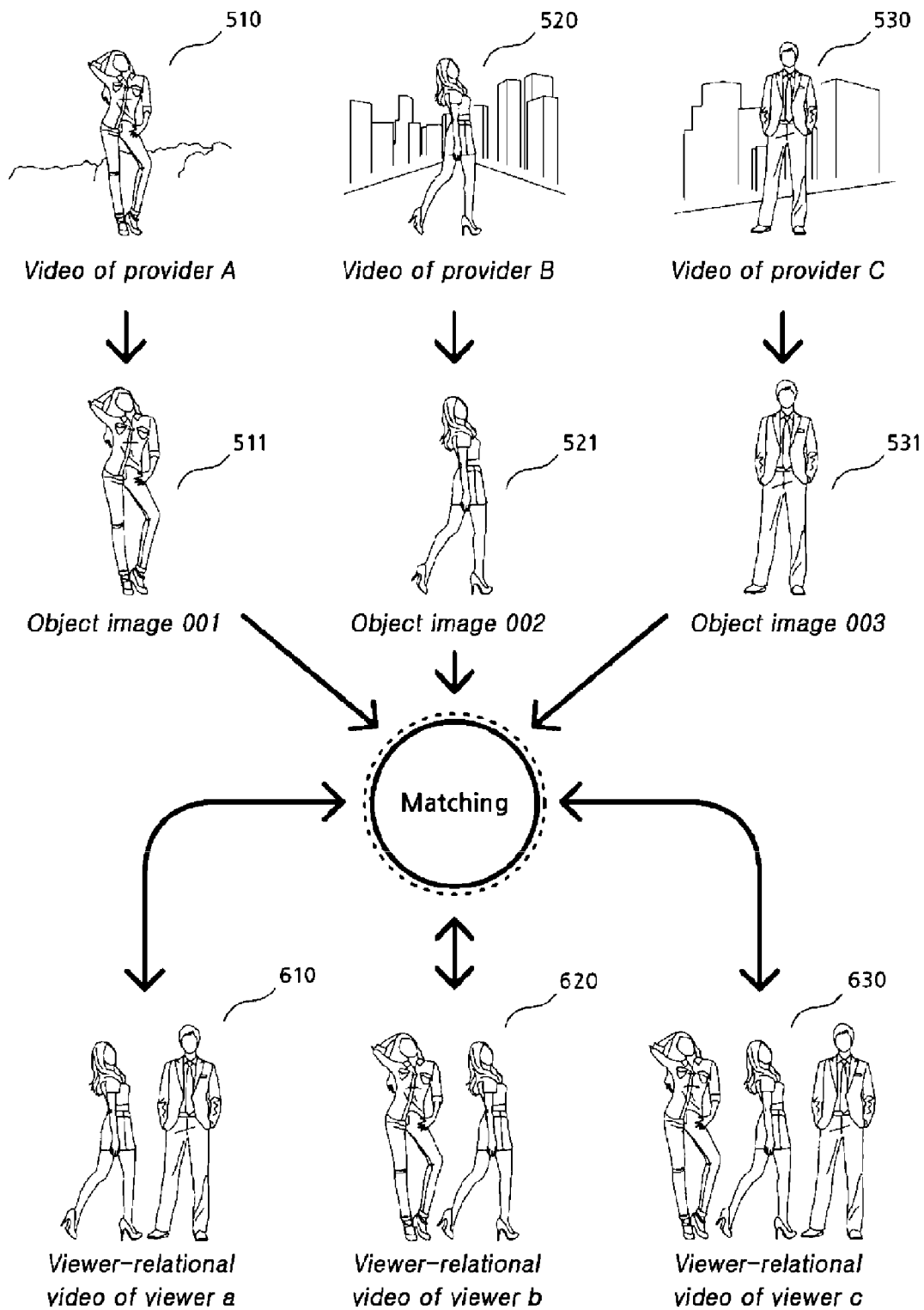
FIG. 2 is a configurational diagram showing a content production form of the present invention.

FIG. 2 is a configurational diagram showing a content production form of the present invention. As shown in FIG. 2, the providers A, B, and C upload recorded or stored videos 510, 520, and 530 to the viewer-relational video producing device 200 through the respective provider terminals (not shown), and then the viewer-relational video producing device 200 extracts personal object images 511, 521, and 531 from the videos 510, 520, and 530 of the providers A, B, and C.

The personal object images 511, 521, and 531 may refer to partial object images including persons appearing in the respective videos 510, 520, and 530, and may further include audio data contained in the videos as necessary.

The personal object images 511, 521, and 531 may be obtained by taking only objects desired to be extracted from the videos while excluding the remaining images, and for example, a typical personal object image extracting method may be a chroma-key method.

The extracted personal object images 511, 521, and 531 are stored in the viewer-relational video producing device 200. Thereafter, when a request signal for a viewer-relational video is received from the viewer terminal 410, 420, or 430 of the viewers a, b, and c, the viewer-relational video producing device 200 selects one or more personal object images associated with the object tag matching 'social relationship' information in the viewer tag of the viewer who has transmitted the request signal. The viewer-relational video producing device 200 composes one or more selected personal object images 511, 521, and 531 in order to thereby produce viewer-relational videos 610, 620, and 630 associated with the viewer a, b, or c who has transmitted the request signal. The viewer-relational video producing device 200 transmits the produced viewer-relational videos 610, 620, and 630 to the viewer terminals 410, 420 and 430 of the respective viewers a, b, and c.

Referring to the viewer tags of FIG. 6, 'social relationship' information of the viewer 'a' is associated with the provider G, the provider B, and the provider C. Since the videos received in the viewer-relational video producing device (not shown) are provided by the provider A, the provider B, and the provider C, the personal object image 002 (521) and the personal object image 003 (531) are selected as the personal object images according to the 'social relationship' information of the viewer 'a'. Therefore, when the viewer 'a' requests a viewer-relational video, a viewer-relational video 610 for the viewer 'a' may be produced by synthesizing the personal object image 002 (521) and the personal object image 003 (531), and may be transmitted to the viewer terminal 410 of the viewer 'a'.

In addition, the 'social relationship' information of the viewer 'b' is associated with the provider A and the provider B, and the personal object image 001 (511) and the personal object image 002 (521) may be selected as the personal object images. When the viewer 'b' requests a viewer-relational video, a viewer-relational video 620 for the viewer 'b' may be produced by composing the personal object image 001 (511) and the personal object image 002 (521), and may be transmitted to the viewer terminal 420.

In addition, the 'social relationship' information of the viewer 'c' is associated with the providers A, B, and C, and the personal object image 001 (511), the personal object image 002 (521), and the personal object image 003 (531) are selected as the personal object images. When the viewer 'c' requests a viewer-relational video, a viewer-relational video 630 for the viewer 'c' may be produced by composing the personal object image 001 (511), the personal object image 002 (521), and the personal object image 003 (531), and may be transmitted to the viewer terminal 430.

FIG. 3 is a configurational diagram showing a viewer-relational video producing device according to the present invention. As shown in FIG. 3, the viewer-relational video producing device 200 includes: a receiver 210 configured to receive videos from one or more provider terminals 110, 120, 130, and 140, and configured to receive request signals for a viewer-relational video from the viewer terminals; an object image extractor 220 configured to extract personal object images from the videos; an object tag generator 230 configured to generate object tags of the personal object images using each video metadata including personal information for each video; a viewer tag generator 250 configured to generate viewer tags using each viewer metadata including social relationship information for each viewer; a storage 240 configured to store the personal object images, the object tags, and the viewer tags; a relation matcher 260 configured to compare social relationship information of the viewer tag corresponding to the viewer of the viewer terminal 410, 420, 430, or 440, among the viewer tags stored in the storage 240, with each personal information of the object tags stored in the storage 240 when the receiver 210 receives the request signal, and configured to retrieve one or more object tags matching the viewer tag according to the comparison in order to thereby generate viewer relationship information; a viewer-relational video producer 270 configured to select one or more personal object images associated with the viewer relationship information from among the personal object images stored in the storage 240, and configured to compose the one or more selected personal object images in order to thereby produce a viewer-relational video; and a viewer-relational video distributor 280 configured to provide the produced viewer-relational video to the viewer terminal 410, 420, 430, or 440.

The receiver 210 receives videos recorded or stored by the provider terminals 110, 120, 130, and 140 of the respective providers A, B, C, and D. The receiver 210 may be directly connected to the provider terminals 110, 120, 130, and 140 through a network, or may provide an environment in which the provider terminals 110, 120, 130, and 140 indirectly access the same through an online website. Accordingly, the provider terminals 110, 120, 130, and 140 may transmit videos to the receiver 210, or may transmit videos to the receiver 210 while being connected to the website.

In the case where the receiver 210 receives videos from the provider terminals 110, 120, 130, and 140, the received videos may include video metadata of the respective providers A, B, C, and D, and the video metadata may be received separately from the video from the provider terminals 110, 120, 130, and 140. In addition, the video metadata of the providers may be stored in the storage 240 of the viewer-relational video producing device 200.

According to an embodiment, the receiver 210 may store, in the storage 240, the videos and the video metadata of the providers received from the provider terminals 110, 120, 130, and 140, and may store, in the storage 240, real-time metadata of the viewers a, b, c, and d, which is included in the request signals for a viewer-relational video received from the viewer terminals 410, 420, 430, and 440.

Meanwhile, viewer metadata including, for example, viewer membership information, private information, preference information, social relationship information, and the like is also stored in the storage 240. The real-time metadata may be information that is input or selected by the respective viewers a, b, c, and d through the respective viewer terminals 410, 420, 430, and 440. In the case where a request signal received by the receiver 210 includes the real-time metadata, the real-time metadata may be included in the viewer metadata of the corresponding viewer, and may then be stored in the storage 240.

The video received by the receiver 210 may include audio data. The audio data included in the video may be configured as a file separate from image data of the video, or may be encoded together with the image data of the video into a single file. The audio data of the video may include performer's voice generated while performing a specific event, sounds used in a performance, and the like.

Furthermore, the receiver 210 may receive videos from the provider terminals 110, 120, 130, and 140, and may receive request signals (may include real-time metadata) for a viewer-relational video from the viewer terminals 410, 420, 430, and 440, or may receive real-time metadata of the respective viewers a, b, c, and d, which is transmitted separately from the request signals. Accordingly, the receiver 210 is configured to receive all of the data transmitted from the provider terminals 110, 120, 130, and 140 and the viewer terminals 410, 420, 430, and 440.

However, the receiver 210 may be configured to include a first receiver (not shown) for receiving videos from the provider terminals 110, 120, 130, and 140 and a second receiver (not shown) for receiving, from the viewer terminals 410, 420, 430, and 440, request signals for a viewer-relational video or the real-time metadata of the respective viewers a, b, c, and d.

FIG. 3 illustrates a single receiver 210 for receiving all of the videos, request signals for a viewer-relational video, and the real-time metadata of the respective viewers a, b, c, and d from the provider terminals 110, 120, 130, and 140 and the viewer terminals 410, 420, 430, and 440.

The providers A, B, C, and D who transmit videos to the receiver 210 may be members of the group operating the viewer-relational video producing device 200, or may be any providers. All of the providers may transmit videos using their own provider terminals 110, 120, 130, and 140.

In addition, the viewers a, b, c, and d who make a request to the viewer-relational video producing device 200 for a viewer-relational video may be members of the group operating the viewer-relational video producing device 200, or may be any viewers. All of the viewers may make a request for a viewer-relational video using their own viewer terminals 410, 420, 430, and 440.

The object image extractor 220 is configured to extract personal object images from the videos stored in the storage 240. The videos contain a variety of objects such as persons, things, backgrounds, or the like. The object image extractor 220 may select and extract a desired object (a person) from among various objects in order to thereby extract a personal object image. The personal object images extracted from the videos by the object image extractor 220 may be configured as at least one of static images or motion pictures. The personal object image may not be limited to an object image in which a person can be identified, and may be an object image obtained by recording a body part of the person or the belongings of the person.

The personal object image may include one selected object, or may include two or more selected objects as necessary. That is, one or more objects may be included in the personal object image, and two or more personal object images may be generated by separately selecting and extracting two or more objects included in the video.

The personal object images may be extracted by the object image extractor 220 in various manners. For example, when a video, which is recorded while a background color is set to blue or green, is received, it is preferable to use a chroma-key method in which the personal object image is extracted by removing the background of the video.

However, since the video must be recorded while the background thereof is set to a color of a key value in the chroma method in order to use the chroma-key as the personal object image extracting method, the chroma-key method for extracting the personal object images can be used only for the video that has a background of such a key value. In addition, in the case of a video that is recorded without using a key value of the chroma technology, the personal object images can be generated using other well-known object extracting methods.

The object image extractor 220 stores, in the storage 240, one or more personal object images extracted from the videos.

Meanwhile, the object image extractor 220 may extract the audio data included in the received video as an object audio, and may store the same in the storage 240 together with the personal object images. In addition, when audio data is received as a separate file from the video, the object image extractor 220 may set the corresponding audio data as the object audio, and may store the same in the storage 240 together with the personal object images.

The object tag generator 230 generates an object tag using the video stored in the storage 240 and the video metadata of the provider who transmitted the corresponding video.

The video metadata of the respective provider A, B, C, and D may include video attribute information, video content information about persons, things, and the background recorded in the video, provider membership information, video producer information, or the like. The video metadata includes information on the person recorded in the video in order to match the social relationship with respect to the viewer. At this time, the video attribute information may include information, such as the file name, the size, the file format, the recording time, the recording location, the video genre, the reproduction time, and the event number of the video, and the video content information may include information such as the person (performer), the things, and the background recorded in the video. The provider membership information may include private information of the provider who has signed up for a membership, social relationship information, preference information (desired genre), residence, sex, age, and the like.

The video content information refers to information about the person, the things, or the background recorded in the video, which are retrieved by analyzing the video received by the receiver 210 and by identifying the same by means of a screen detecting method, and the video content information may be included in the video metadata of the provider.

The video attribute information and the video content information may be included in the video metadata, and the video metadata may be included in the video or may exist as separate data (or file).

Each membership information of the providers A, B, C, and D may include private information of the providers providing the videos, and in particular, may include social relationship information of the providers. The social relationship information includes a friend list stored in a service or a device, such as provider membership information stored in a social network service (SNS) of the provider, a mobile phone address book, or the storage 240.

The object tag generator 230 generates an object tag using the video metadata of the provider including the video attribute information, the video content information, and the provider membership information. At this time, the personal information included in the video content information may be a separate item of the object tag, or may be included in the 'social relationship' information of the object tag according to the embodiment. In addition, social relationship information of the provider is included in the 'social relationship' information of the object tag.

As shown in FIG. 5, the object tag generated to correspond to each personal object image may be divided into a plurality of items, and may, or may not, include information for each item depending on the respective personal object images.

FIG. 5 is an exemplary diagram showing object tags according to an embodiment of the present invention. FIG. 5 shows object tags with respect to the personal object image 001, the personal object image 002, the personal object image 003, and the personal object image 004, which are extracted from the videos transmitted by the providers A, B, C, and D. The items of each object tag include information, such as a provider, a reproduction time, a file format, and the like, indicated by the video attribute information, information, such as a performer (may be a plurality of personal information), a video genre, and the like, indicated by the video content information, and information, such as a social relationship, residence, a desired genre, sex, age, and the like, indicated by the provider membership information.

Meanwhile, the form of the object tag shown in FIG. 5 is illustrated according to an embodiment of the present invention, and the object tag may be generated using various types and items.

One or more storages 240 may be configured, and the storage 240 may store videos transmitted from the provider terminals 110, 120, 130, and 140, personal object images extracted from the stored videos, and object tags for the respective personal object images. In addition, the storage 240 may also store viewer tags generated by the viewer tag generator 250.

In addition, the storage 240 may store video metadata (including provider membership information) of the respective providers.

Furthermore, the storage 240 may store the viewer-relational video produced by the viewer-relational video producer 270. In an embodiment of the present invention, when the viewer-relational video produced by the viewer-relational video producer 270 is provided (through streaming or downloading) to the viewer terminal that transmitted the request signal, the viewer-relational video is preferably deleted from the viewer-relational video producing device 200, but the produced viewer-relational video may be stored in the storage 240 as necessary.

In the case where the viewer-relational video produced by the viewer-relational video producer 270 is not stored in the storage 240 after being provided to the viewer terminals 410, 420, 430, and 440, a production log for the viewer-relational video may be stored in the storage 240. Thereafter, if the viewer terminal 410, 420, 430, or 440 requests the same video, the corresponding personal object images are reselected using the production log of the viewer-relational video stored in the storage 240, and a viewer-relational video may be produced through real-time composition of the reselected personal object images, and may then be provided to the viewer terminal 410, 420, 430, or 440.

In addition, the storage 240 stores a request signal for the viewer-relational video transmitted from the viewer terminal 410, 420, 430, or 440. Since the request signal includes real-time metadata of the viewer to select the personal object images in order to produce the viewer-relational video, a production log of the viewer-relational video may be generated through the stored request signal.

Meanwhile, the storage 240 stores viewer metadata of the viewers a, b, c, and d including membership information of the respective viewers a, b, c and d, and stores a viewer tag generated using the viewer metadata of the viewer according to the request signal for the viewer-relational video.

That is, the information to be stored in the storage 240 may include videos, personal object images, object tags, membership information of the respective providers A, B, C and D, video metadata of the providers A, B, C and D, produced viewer-relational videos, membership information of the viewers, viewer metadata of the viewers, request signals for a viewer-relational video, real-time metadata of the viewers included in the request signals, production logs of the viewer-relational videos, and the like.

In addition, the storage 240 may store background images, background videos, and audio sounds, which may be included when the viewer-relational video is produced. In other words, although the viewer-relational video is produced by the viewer-relational video producer 270 so as to include only the selected personal object images, if necessary, the viewer-relational video may be produced by adding a background image, which is a static image, as a background of the viewer-relational video, or the viewer-relational video may be produced by adding a background video, which is a moving picture, as a background of the selected viewer-relational video. Furthermore, the viewer-relational video may be produced so as to further include audio sounds for a sound effect.

The viewer tag generator 250 generates a viewer tag using viewer metadata of the respective viewers a, b, c, and d, including membership information of the viewers. The viewer metadata, which includes the membership information of the respective viewers a, b, c, and d, is stored in the storage 240. In addition, in the case where the respective viewers generate request signals for a viewer-relational video and transmit the same to the viewer-relational video producing device 200 through the viewer terminals 410, 420, 430, and 440, the real-time metadata, which is transmitted while being included in the request signal or separately from the request signal, may be included in the viewer metadata to then be stored in the storage 240.

That is, the real-time metadata transmitted through the respective viewer terminals 410, 420, 430, and 440 may be generated by at least one of inputting or selecting the same through the respective viewer terminals 410, 420, 430, and 440. The real-time metadata is stored in the viewer metadata stored in the storage 240 and is used to generate the viewer tag. Meanwhile, when a viewer tag is generated using the viewer metadata including the real-time metadata and the generated viewer tag is compared with the object tags, one or more personal object images matching the viewer tag generated using the real-time metadata are preferentially selected in order to thereby meet the viewer's request.

In an embodiment of the present invention, the viewer tag is generated in advance using the viewer metadata stored in the storage 240. Thereafter, when a request signal for a viewer-relational video is received from the viewer terminal and if real-time metadata is included in the request signal, it is preferable to additionally generate the viewer tag using the corresponding real-time metadata.

The viewer tag is used to be compared with the object tags in order to select the personal object images to be used for producing the viewer-relational video. Accordingly, as shown in FIG. 6, the viewer tag generated using the viewer metadata may have a plurality of items, and may, or may not, include information for each item depending on the viewer metadata of each viewer.

FIG. 6 is an exemplary diagram showing viewer tags according to an embodiment of the present invention. FIG. 6 shows viewer tags with respect to the viewer a, the viewer b, the viewer c, and the viewer d, and items of each viewer tag include information, such as a social relationship, residence, a desired genre, sex, age, and the like, according to the viewer membership information.

In particular, the social relationship information may include a friend list stored in a service or a device, such as viewer membership information stored in a social network service (SNS) of the viewer, a mobile phone address book, or the storage 240.

Meanwhile, the form of the viewer tag in FIG. 6 is illustrated according to an embodiment of the present invention, and the viewer tag may be generated using various forms and items.

In addition, when the viewers a, b, c, and d transmit the real-time metadata by inputting and selecting the same through the respective viewer terminals 410, 420, 430, and 440 while requesting a viewer-relational video through the respective viewer terminals 410, 420, 430, and 440, the viewer tag generator 250 includes the transmitted real-time metadata in the viewer metadata of the corresponding viewer. In addition, when comparing the viewer tag and the object tags, one or more object tags, which match the viewer tag generated using the real-time metadata, are selected, and one or more personal object images associated with the one or more selected object tags are preferentially selected. An example of the real-time metadata may be personal information for adding a person who is not included in the social relationship information of the viewer.

The relation matcher 260 selects personal object images for producing a viewer-relational video in response to the request signal for the viewer-relational video transmitted from the viewer terminals 410, 420, 430, and 440. The selection of the personal object images is made by comparing the social relationship information of the viewer tag generated using the viewer metadata of the viewer with the personal information of the object tags and by selecting one or more personal object images associated with one or more object tags matching the viewer tag.

That is, when the receiver 210 receives a request signal for a viewer-relational video transmitted from the viewer terminal 410 of the viewer 'a', the relation matcher 260 compares the viewer tag of the viewer 'a' with the object tags stored in the storage 240 in order to thereby retrieve one or more relevant object tags, and selects one or more personal object images associated with the retrieved object tags.

At this time, the personal object images are selected based on matching priority according to the comparison of the viewer tag and the object tags, and the matching priority is determined as follows.

The matching priorities of the personal object images may be set by the number of items of the object tags that match the viewer tag among the object tags compared with the viewer tag. In addition, the respective items of the viewer tag are given weights (scores), and the matching priority of the object tag matching the viewer tag is set by the number of matching items and the sum of the weights applied to the respective items.

Thus, the matching priorities of the object tags compared with the viewer tag are determined according to the number of items matching the viewer tag or the sum of the weights, and the matching priority is also given to the personal object image associated with the corresponding object tag.

Meanwhile, the weights given to the items of the viewer tag may vary depending on the items. For example, the item of the viewer tag generated using the real-time metadata transmitted from the viewer terminal may be given the highest weight so as to have the highest matching priority among the matching object tags, or the item corresponding to the 'social relationship', among the items of the viewer tag, may be given the highest weight so as to have the highest matching priority among the matching object tags.

If there is no object tag matching the viewer tag, the matching priority cannot be given to the object tags, and if the viewer requests a viewer-relational video while not logging on or anonymously, the viewer tag may not be generated. In this case, the personal object images may be selected in the order of most frequently selected personal object image from among the personal object images stored in the storage 240 in order to thereby produce the viewer-relational video, and produced viewer-relational video may be provided to the viewer terminal. If necessary, the viewer-relational video may be produced and provided by selecting the personal object images that have most recently been selected.

The relation matcher 260 may also select object audio corresponding to the selected personal object images.

According to this embodiment, the object audio refers to the audio data transmitted from the provider terminals 110, 120, 130, and 140 or the audio data contained in the videos received therefrom, and is extracted by the object image extractor 220.

Accordingly, it is preferable to select the personal object images together with the object audio corresponding thereto for the produced viewer-relational video.

Meanwhile, the relation matcher 260 may compare the viewer tag with the respective object tags stored in the storage 240, and may further select a video matching the viewer tag. Accordingly, the video, which is selected by the relation matcher 260 according to the comparison of the viewer tag and the object tags, may be further included in addition to the selected personal object images.

The viewer-relational video producer 270 composes the personal object images selected by the relation matcher 260 to produce a viewer-relational video including the same. A single viewer-relational video is generated by composing the selected personal object image and a background video or by composing two or more personal object images. According to this, a composed viewer-relational video may be obtained by extracting performers recorded in different videos as the personal object images so as to show as if the performers play together. The composition may be preferably conducted in real time using the selected personal object images when a request signal for the viewer-relational video is received from the viewer terminal.

The viewer-relational video producer 270 may allocate the respective layers in which the personal object images are displayed according to the matching priorities of the personal object images selected by the relation matcher 260. There may be a problem in which the personal object images overlap each other because a plurality of personal object images are included in the viewer-relational video. In order to solve this problem, layers are sequentially allocated to the personal object images depending on the matching priorities given thereto. For example, the uppermost layer may be allocated to the personal object image of the first matching priority, and the second layer may be allocated to the personal object image of the second matching priority.

Accordingly, the viewer-relational video producer 270 allocates the layers to the respective personal object images and determines the display positions thereof in the frame of the viewer-relational video based on the matching priority. In addition, if an effect of perspective is required for the respective personal object images displayed according to at least one of the allocated layers or the determined display positions, the viewer-relational video producer 270 may adjust the sizes of the respective personal object images. Then, the personal object images are composed in real time according to the allocated layers, the determined display positions, and the adjusted sizes in order to thereby produce a viewer-relational video.

When the viewer-relational video producer 270 composes the viewer-relational video using the selected personal object images, the viewer-relational video may be produced using the object audio data selected together by the relation matcher 260, and if necessary, the viewer-relational video producer 270 may apply one of the background image or the background video, which is selected by the relation matcher 260, to the background of the viewer-relational video. Furthermore, if the viewer-relational video requires a sound effect, the viewer-relational video may be produced by further including audio sounds stored in the storage 240.

At this time, one or more of the background image, the background video, or the audio sound may be selected for usage by the viewer or by the viewer-relational video producer 270 according to predetermined content. In addition, one or more of the background image, the background video, or the audio sound, which matches the viewer tag generated by the relation matcher 260 using the viewer metadata of the viewer according to the comparison thereof, may be selected for usage.

Meanwhile, the viewer-relational video producer 270 may apply the matching priority in order to determine the display positions of the respective selected personal object images. That is, in the case where the matching priorities of the personal object images included in the viewer-relational video requested by the viewer are determined, the layers and display positions of the personal object images from the highest matching priority to the lowest matching priority or of the personal object images within a predetermined threshold matching priority, among all of the matching priorities for the personal object images, are predetermined to conform to the number of the personal object images, and the selected personal object images matching the viewer tag are disposed at predetermined positions depending on the matching priorities.

For example, if there are three selected personal object images matching the viewer tag, wherein the personal object image of the first matching priority is configured to be positioned at the center of the screen, the personal object image of the second matching priority is configured to be positioned in the right side of the screen, and the personal object image of the third matching priority is configured to be positioned in the left side of the screen, the personal object images selected to correspond thereto may be disposed at the corresponding positions according to their own matching priorities.

In addition, if there are five selected matching personal object images, wherein the personal object image of the first matching priority is configured to be positioned at the center of the screen, the personal object image of the second matching priority is configured to be positioned in the right side of the screen, the personal object image of the third matching priority is configured to be positioned in the left side of the screen, the personal object image of the fourth matching priority is configured to be positioned in the right side on the back row of the screen, and the personal object image of the fifth matching priority is configured to be positioned in the left side on the back row of the screen, the personal object images selected to correspond thereto may be disposed at the corresponding positions according to their own matching priorities. In this case, the selected personal object images of the fourth and fifth matching priorities, which are positioned on the back row of the screen, are configured to be output while the sizes thereof are reduced to give an effect of perspective compared to the personal object images positioned on the front row of the screen.

At this time, in the case where the viewer-relational video producer 270 produces the viewer-relational video including a background image or a background video using the personal object images, the background image or the background video is preferably positioned on the lowermost layer.

Meanwhile, when the relation matcher 260 selects a video associated with the object tag matching the viewer tag, the viewer-relational video producer 270 may produce the viewer-relational video through the composition by further including the selected video in addition to the selected personal object images. In the case of producing the viewer-relational video by further including the selected video, the selected video is used as a background video of the viewer-relational video. That is, since the storage 240 stores original videos having background images and objects, which have not yet extracted, if the corresponding video is used as the background video, a separate background image does not need to be selected.

When the viewer-relational video producer 270 produces the viewer-relational video according to the reception of the request signal for a viewer-relational video from the viewer terminal 410, 420, 430, or 440 of the respective viewers a, b, c, and d, the viewer-relational video producer 270 may compare the viewer tag with the object tags, and may select the personal object images in order to thereby produce the viewer-relational video in real time.

The viewer-relational video distributor 280 provides the viewer-relational video produced by the viewer-relational video producer 270 to the viewer terminal that has requested the viewer-relational video among the viewer terminals 410, 420, 430, and 440.

The viewer-relational video distributor 280 may provide the viewer-relational video to the viewer terminal through a method of downloading the viewer-relational video file or through a real-time streaming method.

At this time, the viewer terminal for receiving the viewer-relational video may be directly connected to the receiver 210 of the viewer-relational video producing device 200 online, or may be indirectly connected thereto through a website or the like. In addition, the viewer-relational video distributor 280 may provide a website as necessary. The viewer-relational video distributor 280 may upload the viewer-relational video to the website 300 of a web server operated separately, and the viewer terminal may be provided with the viewer-relational video through the website 300.

That is, the viewer-relational video is provided by the viewer-relational video distributor 280 to only the viewer terminal 410 that has requested the same, and if another viewer terminal 420, 430, or 440 requests the viewer-relational video, the viewer-relational video is produced using the personal object images selected to match the viewer tag of another viewer and then is provided.

For example, when the viewer terminal a (410), the viewer terminal b (420), the viewer terminal c (430), and the viewer terminal d (440) request the viewer-relational video, respectively, the viewer tag of each of the viewer terminal a, the viewer terminal b, the viewer terminal c, and the viewer terminal d is compared with the object tags, the personal object images associated with the object tags matching the viewer tag are selected according to the comparison result, and the respective viewer-relational videos are produced by composing the personal object images. Then, the viewer-relational video distributor 280 provides the respective produced viewer-relational videos to the viewer terminal a (410), the viewer terminal b (420), the viewer terminal c (430), and the viewer terminal d (440).

That is, even if a plurality of viewers request a viewer-relational video for the same event, the viewer-relational video is produced depending on a relationship between the requesting viewer and the object tags. Therefore, the provided viewer-relational videos are characterized to be different from each other depending on the viewers.

Meanwhile, the viewer-relational video distributor 280 may provide the viewer terminals 410, 420, 430, and 440 with the viewer-relational video produced through the composition by the viewer-relational video producer 270 in a real-time streaming manner, or may allow the viewer terminals 410, 420, 430, and 440 to download the same.

FIG. 4 is a flowchart showing a viewer-relational video producing method according to the present invention. As shown in FIG. 4, the receiver 210 of the viewer-relational video producing device 200 receives videos from the respective provider terminals 110, 120, 130, and 140 (S105).

The respective videos may be recorded for a specific event so that the performers in the videos may be different, while the recording forms and the background images thereof may be the same. In addition, the respective videos may have completely different recording forms and background images.

For example, if the videos relate to a specific event, such as singing a song, different performers may sing the same song in the videos, and if the videos relate to acting, different performers may play their own characters in the performance of the same theme in the videos.

According to an embodiment, the providers or performers participating in a specific event may be configured to reply to agree with composition and utilization of their own videos while participating in the event, and the personal object images may be extracted from only the videos that have been agreed with and the viewer-relational video may be configured to be produced by composing the personal object images selected according to the viewer relationship in real time.

The recorded videos are transmitted to the receiver 210 through the respective provider terminals 110, 120, 130, and 140.

The object image extractor 220 of the viewer-relational video producing device 200 extracts personal object images from the transmitted videos (S110).

Figure 7:
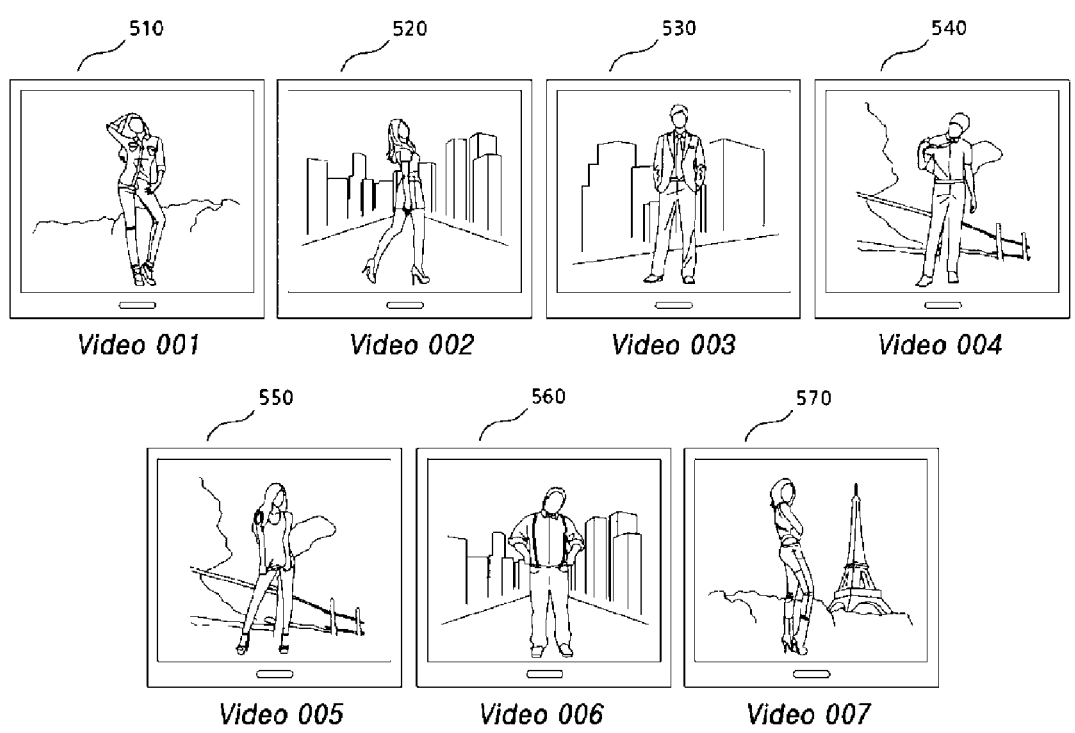
FIG. 7 is an exemplary diagram showing provider videos according to an embodiment of the present invention.
Figure 8:
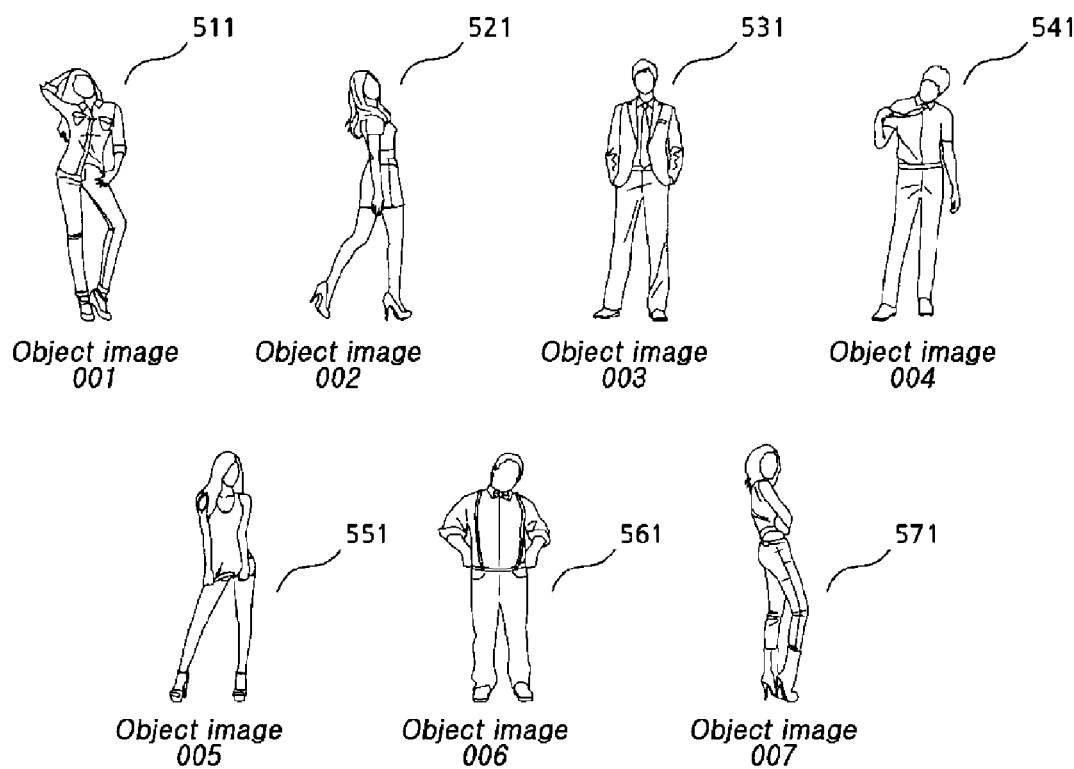
FIG. 8 is an exemplary diagram showing personal object images extracted from the provider videos according to an embodiment of the present invention.

That is, as shown in FIG. 7, which is an exemplary diagram showing provider videos according to an embodiment of the present invention, and FIG. 8, which is an exemplary diagram showing personal object images extracted from the provider videos according to an embodiment of the present invention, the object image extractor 220 removes background images from the respective videos 510, 520, 530, 540, 550, 560, and 570 and extracts personal object images 511, 521, 531, 541, 551, 561, and 571 to be included in the viewer-relational video.

Next, the object tag generator 230 generates object tags using the video metadata included in the videos or received separately from the videos (S115).

The object tags are generated using membership information of the respective providers A, B, C, and D, transmitted video attribute information, video content information, and the like, and the generated object tags are compared with the viewer tag of the viewer requesting the viewer-relational video to determine whether or not to match the viewer tag. Accordingly, the personal object images associated with the object tag matching the viewer tag may be selected.

The object tag may be configured as shown in FIG. 5, and some items of the object tag may be excluded or other items may be added thereto as necessary.

Next, the viewer tag generator 250 generates a viewer tag using viewer metadata of the viewers a, b, c, and d stored in the storage 240 (S120). The viewer tag may be configured as shown in FIG. 6, and some items of the viewer tag may be excluded or other items may be added thereto as necessary.

The storage 240 stores the received videos, the generated object tags, and the generated viewer tags (S125).

The storage 240 preferably stores the received videos and the personal object images extracted from the respective videos such that they are associated with each other.

That is, the storage 240 stores the videos 510, 520, 530, and 540 in FIG. 7 received by the receiver 210 from the provider terminals 110, 120, 130, and 140. In addition, the storage 240 stores personal object images 511, 521, 531, and 541 in FIG. 7 that the object image extractor 220 has extracted from the received videos 510, 520, 530, and 540 in FIG. 7. In addition, the storage 240 stores the object tags (see FIG. 5) generated by the object tag generator 230. Furthermore, the storage 240 stores the viewer tags (see FIG. 6) generated by the viewer tag generator 250.

The storage 240 may simultaneously store the videos 510, 520, 530, and 540 in FIG. 7, the personal object images 511, 521, 531, and 541 in FIG. 7, the object tags (see FIG. 5), and the viewer tags (see FIG. 6) in step S125, or may separately store the videos 510, 520, 530, and 540 in FIG. 7, the personal object images 511, 521, 531, and 541 in FIG. 7, the object tags (see FIG. 5), and the viewer tags (see FIG. 6) in the respective steps.

The receiver 210 determines whether or not a request signal for a viewer-relational video is received from one of the viewer terminals 410, 420, 430, and 440 (S130).

If no request signal is received from the viewer terminals 410, 420, 430, and 440, the receiver 210 may continue to receive the videos transmitted from the provider terminals 110, 120, 130, and 140. However, the receiver 210 may receive the videos from the provider terminals 110, 120, 130, and 140 at the same time while the configurations included in the viewer-relational video producing device 200 are performing an operation of producing the viewer-relational video.

Thereafter, the relation matcher 260 compares the viewer tag of the viewer who transmitted the request signal with the object tags stored in the storage 240 in order to thereby retrieve the object tags matching the viewer tag in order to produce the viewer-relational video requested by the viewer terminal 410, 420, 430, and 440 (S135). In particular, the object tags may be retrieved by comparing the social relationship information of the viewer tag with the personal information of the object tags.

The viewer tag generator 250 may preferably generate the viewer tag using the viewer metadata of the respective viewers stored in the storage 240 in step S120, but, if necessary, the viewer tag generator 250 may generate the viewer tag using the viewer metadata of the viewer after the request signal is received from the viewer in step S130.

That is, the viewer tags may be generated in advance using the viewer metadata of the respective viewers stored in the storage 240 and may be stored in the storage 240 in a batch, or after a request signal for the viewer-relational video is received from a certain viewer, the viewer tag may be generated by the viewer tag generator 250 and may then be stored in the storage 240.

Meanwhile, if the request signal for the viewer-relational video transmitted from the viewer includes real-time metadata of the viewer, the viewer tag generator 250 generates an additional viewer tag using the received real-time metadata and includes the additionally generated viewer tag in the viewer tag of the corresponding viewer stored in the storage 240. Accordingly, in the case where the additional viewer tag is generated using the real-time metadata, the viewer tag to be compared with the object tags includes the additional viewer tag.

Meanwhile, the matching priority may be set to the object tags retrieved according to the comparison with the viewer tag in step S135. For example, the matching priority may be set in two ways. In the first method, the matching priority is set according to the number of items matching the viewer tag in the comparison of the viewer tag with the object tags. That is, the matching priorities are sequentially set according to the number of items of the object tag, which match the items included in the viewer tag, respectively.

In the second method, the viewer tag is given a weight, and the matching priority is set according to the result of summating the weights applied to the object tags matching the viewer tag given the weight. For example, in the case where a high weight is given to 'social relationship information' among the items of the viewer tag and low weights are given to the remaining items, the object tag matching the 'social relationship information' may have a high matching priority.

Alternatively, the object tag having a high weight, which matches the 'social relationship information' among the items of the viewer tag, may have a high matching priority.

The relation matcher 260 selects the personal object images associated with the object tags retrieved in step S135 (S140).

The relation matcher 260 may select the personal object images according to the matching priorities of the object tags. The relation matcher 260 may be configured to select the personal object images as many as a number determined according to a matching priority policy predetermined by the viewer-relational video producing device 200 or according to request matching priority information requested by the viewer.

Depending on the embodiment, it may be configured to select the personal object images associated with all of the object tags matching the viewer tag.

Meanwhile, the relation matcher 260 may select a video or personal object images to be used for the viewer-relational video among the object tags matching the viewer tag as necessary. One or more videos are selected from the videos, which are associated with the object tags matching the viewer tag, stored in the storage 240.

At this time, the relation matcher 260 may select the video of the object tag having the highest matching priority. A request for selecting a video may be transmitted to the viewer terminal of the viewer who has requested the viewer-relational video, and the video specified by the viewer may be selected. At this time, when the relation matcher 260 makes a request to the viewer terminal for the selection of the video, the relation matcher 260 may provide the viewer terminal with all or some of the candidate videos for the video selection in order to facilitate the video selection of the viewer.

The viewer-relational video producer 270 produces a viewer-relational video using the personal object images selected in step S140 (S145).

The viewer-relational video producer 270 selects the personal object images associated with the object tags matching the viewer tag to thus produce the viewer-relational video requested from the viewer as shown in FIGS. 9 to 12.

Figure 9:
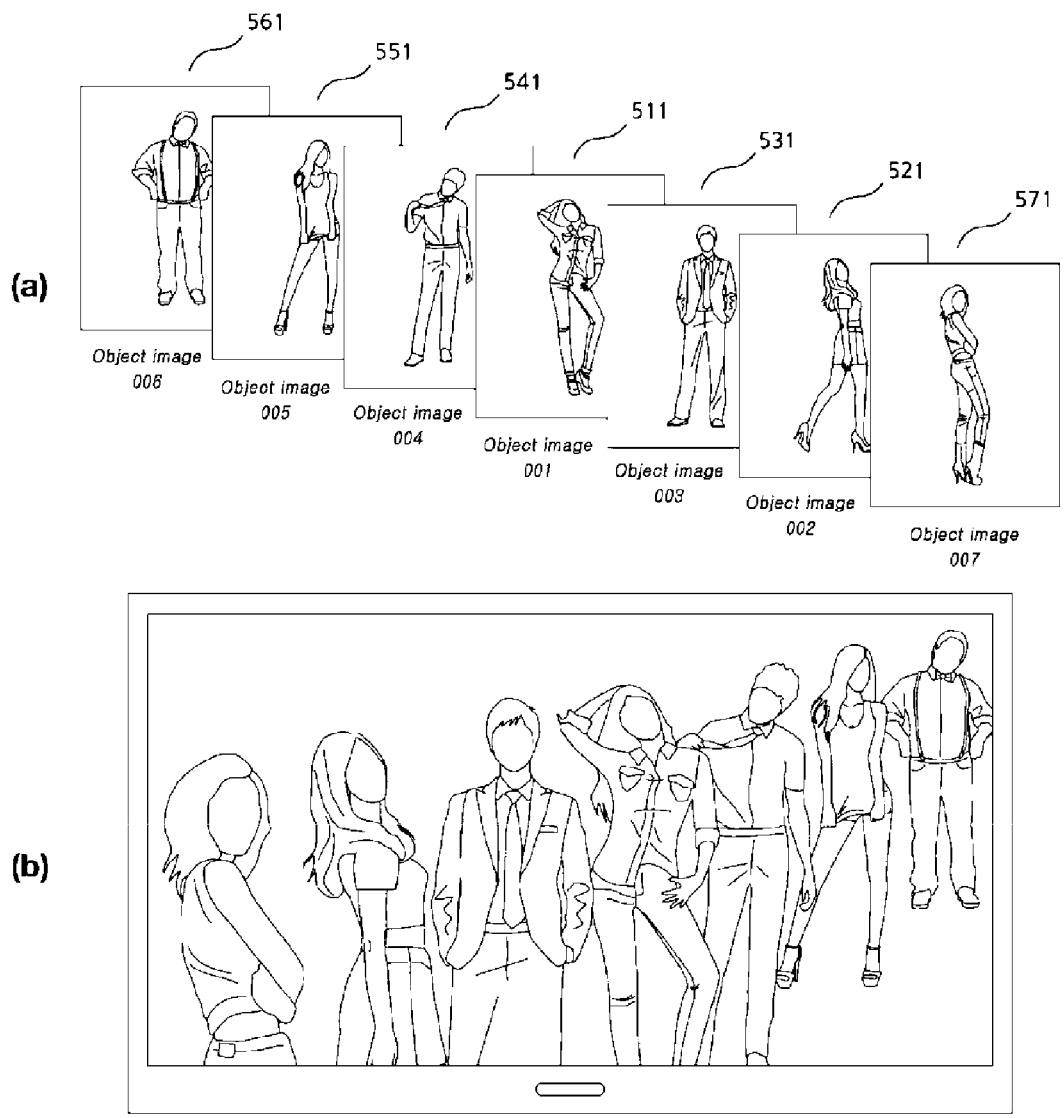
FIG. 9 is a diagram showing an example of producing a viewer-relational video by allocating layers to the personal object images according to an embodiment of the present invention.

FIG. 9 is a diagram showing an example of producing a viewer-relational video by allocating layers to the personal object images according to an embodiment of the present invention. As shown in FIG. 9A, the personal object images 511, 521, 531, 541, 551, 561, and 571 are generated by extracting objects, such as performers in the videos, by the object image extractor 220 from the videos (see FIG. 7) received by the receiver 210 of the viewer-relational video producing device 200, and the generated personal object images are stored in the storage 240.

If the matching priority is determined in the order of the personal object image 007 (571), the personal object image 002 (521), the personal object image 003 (531), the personal object image 001 (511), the personal object image 004 (541), the personal object image 005 (551), and the personal object image 006 (561) among the stored personal object images 511, 521, 531, 541, 551, 561, and 571, the viewer-relational video producer 270 may compose the respective personal object images in the form of a layer to correspond to the matching priority in producing the viewer-relational video using the personal object images 511, 521, 531, 541, 551, 561, and 571.

That is, as shown in FIG. 9A, the layers may be allocated to the personal object images 511, 521, 531, 541, 551, 561, and 571 such that the personal object image 006 (561) of the lowest matching priority is located in the lowermost layer, the personal object image 005 (551) of the next matching priority is located in the upper layer of the personal object image 006 (561), and subsequent personal object images 004 (541) to 007 (571) are sequentially located in the upper layers, respectively.

Meanwhile, after the layers are allocated to the respective personal object images 511, 521, 531, 541, 551, 561, and 571, the positions of the respective personal object images to be displayed in the screen of the viewer-relational video are determined. If all of the respective personal object images are displayed at the center of the screen without properly disposing the same, the personal object image 007 (571) of the first matching priority may be displayed in the foremost layer, and the remaining personal object image 002 (521) of the second matching priority to the personal object image 006 (561) of the seventh matching priority, which will be located in the subsequent layers, may be covered by the personal object image 007 (571).

Accordingly, the respective personal object images 511, 521, 531, 541, 551, 561, and 571 have their own layers according to the calculated matching priority, and the display positions of the personal object images having the layers are determined in the screen, thereby producing the viewer-relational video having a screen configuration as shown in FIG. 9B.

At this time, if an effect of perspective is required for the personal object images 511, 521, 531, 541, 551, 561, and 571 according to the layers thereof, as shown in FIG. 9B, the sizes of the personal object images can be adjusted from the uppermost layer to the lowermost layer. However, although the personal object images are located in different layers, if the personal object images are adjusted to have the same size, it will give an effect in which the personal object images look as if they are on the same line in the screen of the viewer-relational video.

FIG. 10 is a diagram showing an example of producing a viewer-relational video corresponding to a social relationship of a viewer tag according to an embodiment of the present invention. As shown in FIG. 10A, the personal object images 511, 521, 531, and 541 extracted from four videos received from the provider terminals 110, 120, 130, and 140 are stored in the storage 240.

After which, when the receiver 210 receives a request signal for a viewer-relational video from the viewer terminal 410 of the viewer 'a', in response to the request signal, the receiver 210 compares the viewer tag of the viewer 'a' with the object tags and selects the personal object images associated with the object tags of the matching priorities according to the comparison result.

That is, referring to FIGS. 5 and 6, when there are personal object images 511, 521, 531 and 541 of the providers A, B, C and D, upon comparing the viewer tag of the viewer 'a' and the object tags of the providers A, B, C and D, the object tags that match the item 'social relationship', among the viewer tag items of the viewer 'a', may be retrieved.

Referring to FIG. 6, the item 'social relationship' of the viewer 'a' has social relationship information in the order of the provider G, the provider B, and the provider C. However, since the personal object images are obtained only from the provider A, the provider B, the provider C, and the provider D, the provider B and the provider C, except for the provider G, are retrieved to match the social relationship of the viewer 'a'. Accordingly, the viewer-relational video of the viewer 'a' is produced using the personal object image 002 and the personal object image 003 corresponding to the provider B and the provider C, respectively.

Meanwhile, FIG. 13, which is a diagram showing an example of calculating a weight of the object tag matching the viewer tag depending on the weight given to the viewer tag according to an embodiment of the present invention, shows weights set to the viewer tag items of the viewer 'a', which are calculated by comparing the viewer tag of the viewer 'a' with the object tags of the providers A, B, C, and D. At this time, among the viewer tag items of the viewer 'a', the weights of the item 'social relationship' are retrieved such that the provider A has '0', the provider B has '3', the provider C has '3', and the provider D has '0' according to the items of the viewer tag and the object tags as shown in FIGS. 5 and 6. Even though the provider B and the provider C have the same weight of '3' for the item 'social relationship', the matching priorities thereof may be calculated according to the listing order.

Accordingly, the matching priority according to the comparison of the item 'social relationship' between the viewer tag of the viewer 'a' with the object tags may be configured such that the personal object image 002 (521) of the provider B has the first matching priority, the personal object image 003 (531) has the second matching priority, and the personal object image 001 (511) and personal object image 004 (541) have the same matching priority (the third matching priority) even though the object tags thereof do not match the viewer tag. However, it is also possible to calculate the matching priorities of the personal object images by assigning the third matching priority and the fourth matching priority according to the order in which the personal object images are stored.

In other words, in the case where the display positions of the personal object images, which have no social relationship with the viewer 'a', is not important in the viewer-relational video screen, the personal object images, which have no social relationship with the viewer 'a', may have the same matching priority so that the personal object images may be randomly disposed. In the case where the display positions of the personal object images, which have no matching priority, are required to be determined, the display positions of the personal object images may be preferably determined using a method for giving the matching priority to the personal object images in the order of identification numbers given to the personal object images or a method of randomly giving matching priorities to the personal object images.

Accordingly, as shown in FIG. 10B, the layers are sequentially allocated to four personal object images from the first matching priority to the joint third matching priority according to the comparison of the item 'social relationship' of each tag. Thus, the personal object image 002 (521) of the first matching priority is disposed in the left side on the front row in the viewer-relational video screen that is composed in real time, the personal object image 003 (531) of the second matching priority is disposed in the right side on the front row in the screen, the personal object images 001 (511) having a smaller identification number, among the personal object images 001 (511) and the personal object images 004 (541) of the joint third matching priority, is disposed in the left side on the back row in the screen, and then the personal object images 004 (541) is disposed in the right side on the back row in the screen.

Meanwhile, in order to give an effect of perspective to the personal object images disposed on the front row and the back row, it is preferable to adjust the sizes thereof and display the same such that the personal object image 001 (511) and the personal object image 004 (541) disposed on the back row become smaller than the personal object image 002 (521) and the personal object image 003 (531) disposed on the front row. The respective personal object images are disposed in the screen based on the matching priority to correspond to a screen layout predetermined by the viewer-relational video producer 270.

In addition, as shown in FIG. 10C, in the case where a screen according to another embodiment has a layout in which images are disposed from the left side on the front row to the right side on the back row, the personal object image 002 (521) of the first matching priority is disposed in the left side on the front row where it is most visible, the personal object image 003 (531) of the second matching priority is disposed in the right side behind the first matching priority position, the object image 001 (510) of the third matching priority is disposed in the right side behind the second matching priority position, and the personal object image 004 (541) of the fourth matching priority is disposed in the right side behind the third matching priority position, thereby giving an effect of perspective in which the personal object image becomes smaller as it goes to the right side of the screen.

In addition, as shown in FIG. 10D, the viewer-relational video may be produced by enlarging the respective personal object images compared to FIG. 10C while the positions of the personal object images according to the matching priority in the viewer-relational video are the same as those in FIG. 10C so that the respective personal object images can be viewed in more detail.

That is, the sizes of the personal object images 511, 521, 531, and 541 are adjusted so that the whole body of each performer of the personal object images can be displayed within the screen in FIG. 10C, while FIG. 10D shows an embodiment in which the respective personal object images 511, 521, 531, and 541 are enlarged and disposed such that only a part of each performer of the respective personal object images 511, 521, 531, and 541 is displayed.

FIG. 11 is a diagram showing an example of adjusting the positions and sizes of the personal object images associated with the object tags matching the viewer tag in the screen of a viewer-relational video based on the matching priorities of the object tags according to an embodiment of the present invention. As shown in FIG. 11A, personal object images 551, 561, and 571 may be received from additional providers after the viewer-relational video has been provided by the viewer-relational video producing device in response to the request for the viewer-relational video from the viewer 'a' using four personal object images 511, 521, 531, and 541 (see FIG. 10).

The viewer-relational video may be provided by composing the personal object images 511, 521, 531, 541, 551, 561, and 571 extracted according to the request of the viewer 'a'. Although FIG. 11A shows an example in which three personal object images 551, 561, and 571 are added, the number of personal object images extracted and added may vary according to the number of videos uploaded to the viewer-relational video producing device 200.

Accordingly, as shown in FIG. 11B, when the viewer 'a', which has requested the viewer-relational video in FIG. 10, requests a viewer-relational video again after the three personal object images 551, 561, and 571 have been added, the relation matcher 260 of the viewer-relational video producing device 200 compares the viewer tag of the viewer 'a' with the object tags of the personal object images 511, 521, 531, 541, 551, 561, and 571 in order to thereby retrieve the object tags matching the same.

At this time, the personal object image 001 (511) and the personal object image 004 (541), which have not matched the viewer tag of the viewer 'a' in the embodiment of FIG. 10, are determined to have a relationship with the viewer 'a' because it has been included in viewer-relational video for the corresponding viewer in the embodiment of FIG. 10. Thus, the data, such as 'provider' or 'performer', among the items of the object tag corresponding to the personal object images, is included in the item 'social relationship' of the viewer tag. In addition to the item 'social relationship', the items, such as 'event number' and 'personal object image identification number', may be further included.

According to this, as shown in FIG. 11B, it is determined that the object tag of the personal object image 007 (571), which is added in the state in which the viewer tag of the viewer 'a' has been updated, matches the viewer tag, and it is determined that the respective object tags newly match the viewer tag after the personal object image 001 (511) and the personal object image 004 (541), which have not matched the viewer tag in FIG. 10, are included in the viewer-relational video.

That is, the matching priorities of all of the personal object images 511, 521, 531, 541, 551, 561, and 571 including the personal object image 001 (511) and the personal object image 004 (541), which newly form the item 'social relationship' in the items of the viewer tag of the viewer 'a', may be calculated as follow. The first matching priority with respect to the viewer tag of the viewer 'a' is set to the personal object image 007 (571), the second matching priority is set to the personal object image 002 (521), the third matching priority is set to the personal object image 003 (531), the fourth matching priority is set to the personal object image 001 (511), the fifth matching priority is set to the personal object image 004 (541), and the sixth matching priority is set to both the personal object image 005 (551) and the personal object image 006 (561), which have no matching relationship.

According to this, layers are sequentially allocated to the response personal object images from the first matching priority to the seventh matching priority, and the personal object image 007 (571) of the first matching priority is disposed in the center on the front row in the screen of the viewer-relational video that is composed in real time. The personal object image 002 (521) of the second matching priority is disposed in the left side on the front row in the screen. The personal object image 003 (531) of the third matching priority is disposed in the right side on the front row in the screen. The personal object image 001 (511) of the fourth matching priority is disposed at the second place to the left from the center of the screen on the back row. The personal object image 004 (541) of the fifth matching priority is disposed at the first place to the left from the center of the screen on the back row. The personal object image 005 (551), which has a smaller number among the personal object image 005 (551) and the personal object image 006 (561) of the joint sixth matching priority, is disposed at the first place to the right from the center of the screen on the back row, and then the personal object image 006 (561) is disposed at the second place to the right from the center of the screen on the back row.

Meanwhile, in order to give an effect of perspective to the personal object images disposed on the front and back rows, the sizes of the personal object image 001 (511), the personal object image 004 (541), the personal object image 005 (551), and the personal object image 006 (561), which are disposed on the back row, are adjusted to be relatively smaller than those of the personal object image 007 (571), the personal object image 002 (521), and the personal object image 003 (531), which are disposed on the front row. The respective personal object images are disposed in the screen based on the matching priority to correspond to the screen layout predetermined by the viewer-relational video producer 270.

The respective personal object images 511, 521, 531, 541, 551, 561, and 571 are disposed and composed in the screen of the viewer-relational video requested by the viewer 'a' according to the matching priority above.

As shown in FIG. 11C, the respective personal object images may be composed by being enlarged compared to FIG. 11B while the positions thereof in the viewer-relational video according to the matching priority are the same as those in FIG. 11B so that the respective personal object images can be seen in more detail.

That is, the sizes of the respective personal object images 511, 521, 531, 541, 551, 561, and 571 are adjusted so that the whole body of each performer of the personal object images can be displayed within the screen in FIG. 11B, while FIG. 11C shows an embodiment in which the respective personal object images 511, 521, 531, 541, 551, 561, and 571 are enlarged and disposed such that only a part of each performer of the personal object images is displayed.

Figure 12:
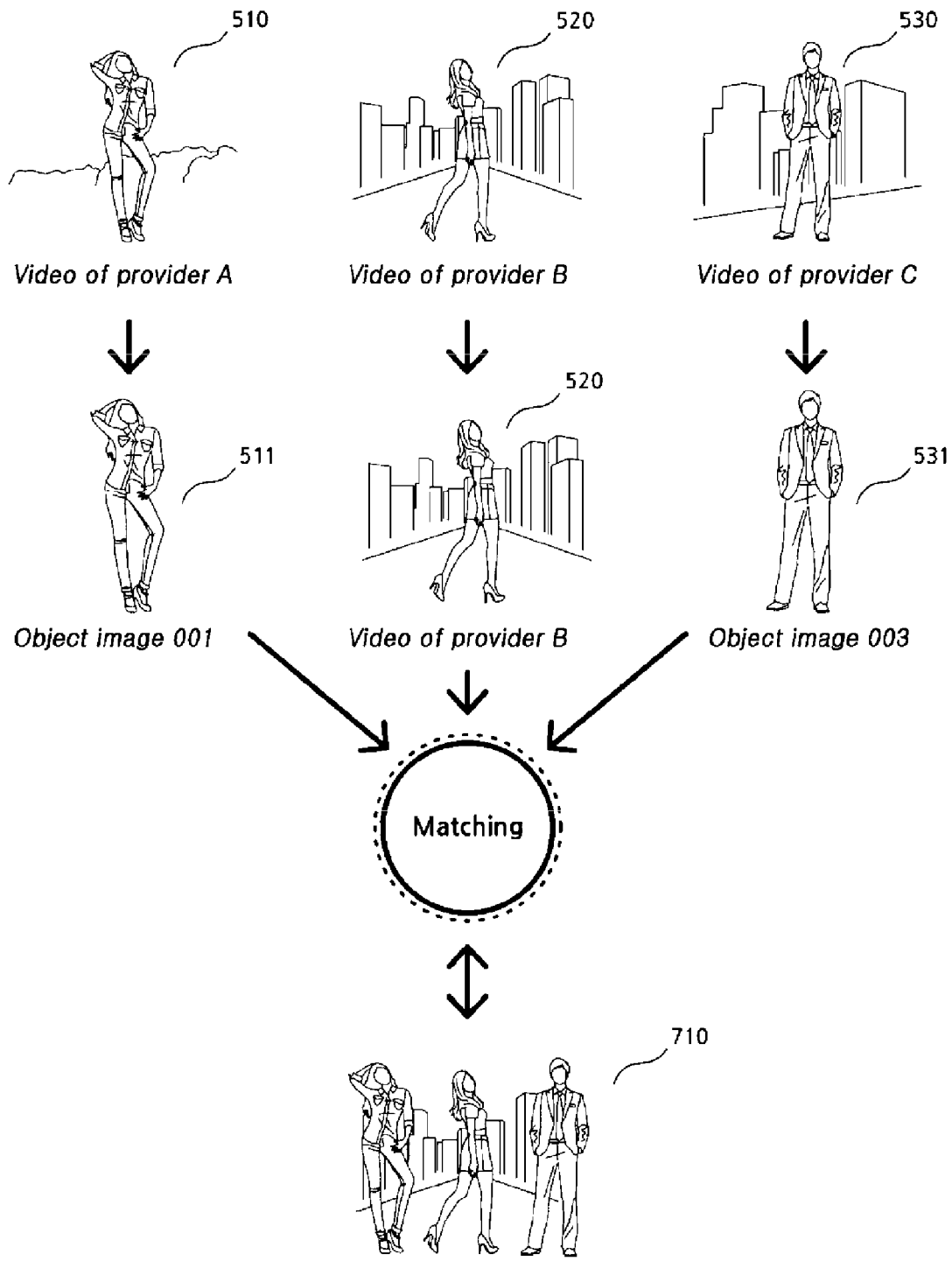
FIG. 12 a diagram showing an example of using a personal object image associated with an object tag matching a viewer tag as a background image of a viewer-relational video according to an embodiment of the present invention.

FIG. 12 a diagram showing an example of using a personal object image associated with an object tag matching a viewer tag as a background image of a viewer-relational video according to an embodiment of the present invention. As shown in FIG. 12, in response to a request for a viewer-relational video from the viewer, the relation matcher 260 compares the viewer tag of the viewer with the object tags and retrieves the object tags matching the viewer tag according to the comparison result.

At this time, according to an embodiment of the present invention, it is preferable to select the personal object images associated with the retrieved object tags and to produce the viewer-relational video. However, as shown in FIG. 12, when background image information predetermined in the viewer-relational video producing device 200 is to be used or a request for using a background image is received from the viewer, the viewer-relational video producer 270 may select one or more of the videos transmitted from the providers A, B, and C to thus use the same as a background video.

In other words, when selecting the personal object images associated with the object tags matching the viewer tag of the viewer, the associated video may be selected, instead of the personal object images associated with a specific object tag.

Therefore, the personal object image 001 (511) and personal object image 003 (531), which are associated with the object tags matching the viewer tag of the viewer, and the video of the provider B are selected.

The viewer-relational video producer 270, among the selected personal object image 001 (511), personal object image 003 (531), and the video of the provider B, may use the video of the provider B as a background image of the corresponding viewer-relational video, and may allocate the personal object image 001 (511) and the personal object image 003 (531) to an upper layer of the background image, thereby producing the viewer-relational video 710.

Lastly, the viewer-relational video distributor 280 transmits the viewer-relational video produced in step S145 to the viewer terminal of the corresponding viewer (S150).

The viewer-relational video distributor 280 may provide the viewer-relational video to the viewer terminals 410, 420, 430, and 440 through a real-time streaming method, or may allow the viewer terminals 410, 420, 430, and 440 to download the same. Furthermore, the viewer terminals 410, 420, 430, and 440 may be directly connected to the viewer-relational video distributor 280 in order to receive the viewer-relational video through their own methods, and may access a website (not shown) provided in the viewer-relational video distributor 280 or a website (not shown) provided in a separately located web server (not shown) to thus receive the corresponding viewer-relational video.

Meanwhile, when the respective viewers a, b, c, and d request the viewer-relational video through the their own viewer terminals 410, 420, 430, and 440, the personal object images matching the respective viewer tags may be selected, and the viewer-relational videos matching the respective viewers a, b, c, and d may be produced using the personal object images that are differently selected.

In the present invention, the viewer terminals 110, 120, 130, and 140 may further transmit sub-videos in addition to the videos transmitted to the receiver 210. The provider may record a video through a main camera, and, at the same time, may record a sub-video using a sub-camera in addition to the main camera during the performance of the performer.

In other words, the sub-video may be obtained under the conditions, such as a recording viewpoint, a recording distance, a recording angle, which are different from those in the video recorded by the main camera, so that the performer looks different from the performer of the main recording. If there are sub-videos belonging to the respective provider terminals 110, 120, 130, and 140, the provider terminals 110, 120, 130, and 140 may transmit the same to the viewer-relational video producing device 200.

The sub-video may contain audio data, and if no audio data is contained in the sub-video, the audio data contained in the video recorded and transmitted by the main camera may be shared for usage. In other words, since the video and the sub-video, which are recorded by different recording devices at the same time and at the same place, have the same audio data, the audio data of the sub-video may be omitted.

Meanwhile, if there is a sub-video corresponding to the received video, the object image extractor 220 extracts sub-personal object images of the sub-video and stores the same in the storage 240. The sub-personal object image also uses the object tag produced using the corresponding video. When the personal object image is selected through the comparison with the viewer tag by the relation matcher 260, if there is a sub-personal object image corresponding to the selected personal object image, the sub-personal object image is selected together with the personal object image and is included in the viewer-relational video produced by the viewer-relational video producer 270.

Although the present invention shows and describes exemplary embodiments as discussed above, the present invention is not limited to the embodiments and a person skilled in the art to which the present invention pertains may implement various changes and modifications without departing from the spirit of the present invention.

The invention claimed is:

1. A viewer-relational video producing device comprising:
- a receiver configured to receive videos from one or more provider terminals, and configured to receive request signals for a viewer-relational video from the viewer terminals;
- an object image extractor configured to extract person object images from the videos;
- an object tag generator configured to generate object tags of the person object images using each video metadata including person information for each video;
- a viewer tag generator configured to generate viewer tags using each viewer metadata including social relationship information for each viewer;
- a storage configured to store the person object images, the object tags, and the viewer tags;
- a relation matcher configured to compare social relationship information of the viewer tag corresponding to the viewer of the viewer terminal, among the viewer tags stored in the storage, with the respective person information of the object tags stored in the storage when the receiver receives the request signal, and configured to retrieve one or more object tags matching the viewer tag according to the comparison in order to thereby generate viewer relationship information, wherein the social relationship information is provided from a friend list or an address book provided from any one of a social network service (SNS), a mobile phone, and the storage;
- a viewer-relational video producer configured to select one or more person object images associated with the viewer relationship information from among the person object images stored in the storage, and configured to compose the one or more selected person object images to thus produce a viewer-relational video including the same; and
- a viewer-relational video distributor configured to provide the produced viewer-relational video to the viewer terminal.

2. The viewer-relational video producing device of claim 1, wherein the storage further stores the videos received by the receiver.

3. The viewer-relational video producing device of claim 2, wherein the viewer-relational video producer further selects and performs the step of composing one or more videos associated with the viewer relationship information generated by the relation matcher from among the videos stored in the storage, and wherein the one or more videos are used as a background video of the viewer-relational video.

4. The viewer-relational video producing device of claim 1, wherein the viewer tag generator generates the viewer tags including a plurality of items and gives weights to the plurality of items such that the social relationship information is given a high weight.

5. The viewer-relational video producing device of claim 4, wherein the relation matcher calculates matching priorities of the object tags using the sum of weights applied to the items matching the object tag, among the plurality of items of the viewer tags.

6. The viewer-relational video producing device of claim 5, wherein the viewer-relational video producer generates the viewer-relational video by selecting the person object images associated with the object tags of which the matching priorities are within a threshold range.

7. The viewer-relational video producing device of claim 5, wherein the viewer-relational video producer allocates layers to the respective person object images displayed in the viewer-relational video screen to correspond to the matching priorities of the object tags.

8. The viewer-relational video producing device of claim 5, wherein the viewer-relational video producer determines display positions of the person object images using the matching priorities.

9. The viewer-relational video producing device of claim 8, wherein the viewer-relational video producer adjusts the sizes of the respective person object images to correspond to the display positions of the person object images.

10. The viewer-relational video producing device of claim 1, wherein if the request signal received from the viewer terminal comprises real-time metadata, the relation matcher further incorporates the real-time metadata in the viewer metadata corresponding to the viewer of the viewer terminal.

11. The viewer-relational video producing device of claim 10, wherein the relation matcher compares the viewer tag generated using the real-time metadata corresponding to the viewer of the viewer terminal with the person information of the object tags stored in the storage, retrieves one or more object tags matching the viewer tag according to the comparison, and further comprises the same in the viewer relationship information.

12. The viewer-relational video producing device of claim 11, wherein the viewer-relational video producer preferentially selects one or more person object images associated with the real-time metadata from among the viewer relationship information, and produces the viewer-relational video by further including the one or more preferentially selected person object images.

13. A method for producing a viewer-relational video, the method comprising the steps of:
- (a) letting a receiver receive videos from one or more provider terminals;
- (b) letting an object image extractor extract person object images from the videos;
- (c) letting an object tag generator generate object tags of the person object images using each video metadata including person information for each video;
- (d) letting a viewer tag generator generate a viewer tag using each viewer metadata including social relationship information for each viewer;
- (e) letting a storage store the person object images, the object tags, and the viewer tags;
- (f) letting a receiver receive a request signal for a viewer-relational video from a viewer terminal;
- (g) letting a relation matcher compare social relationship information of the viewer tag corresponding to the viewer of the viewer terminal, among the viewer tags stored in the storage, with the respective person information of the object tags stored in the storage and retrieve one or more object tags matching the viewer tag according to the comparison in order to thereby generate viewer relationship information, wherein the social relationship information is provided from a friend list or an address book provided from any one of a social network service (SNS), a mobile phone, and the storage;

(h) letting a viewer-relational video producer select one or more person object images associated with the viewer relationship information among the person object images stored in the storage and compose the one or more selected person object images to thus produce a viewer-relational video including the same; and (i) letting a viewer-relational video distributor provide the produced viewer-relational video to the viewer terminal.

14. The method of claim 13, wherein the storage further stores the videos received by the receiver in the step (e).

15. The method of claim 14, wherein the viewer-relational video producer further selects and performs the step of composing one or more videos associated with the viewer relationship information generated by the relation matcher from among the videos stored in the storage in the step (h), and wherein the one or more videos are used as a background video of the viewer-relational video.

16. The method of claim 13, wherein the viewer tag generator generates the viewer tags including a plurality of items and gives weights to the plurality of items such that the social relationship information is given a high weight in the step (d).

17. The method of claim 16, wherein the relation matcher calculates matching priorities of the object tags using the sum of weights applied to the items matching the object tag, among the plurality of items of the viewer tags, in the step (g).

18. The method of claim 17, wherein the viewer-relational video producer generates the viewer-relational video by selecting the person object images associated with the object tags of which the matching priorities are within a threshold range in the step (h).

19. The method of claim 17, wherein the viewer-relational video producer allocates layers to the respective person object images displayed in the viewer-relational video screen to correspond to the matching priorities of the object tags in the step (h).

20. The method of claim 17, wherein the viewer-relational video producer determines display positions of the person object images using the matching priorities in the step (h).

21. The method of claim 20, wherein the viewer-relational video producer adjusts the sizes of the respective person object images to correspond to the display positions of the person object images in the step (h).

22. The method of claim 13, wherein if the request signal received from the viewer terminal comprises real-time metadata, the relation matcher further incorporates the real-time metadata in the viewer metadata corresponding to the viewer of the viewer terminal in the step (f).

23. The method of claim 22, wherein the relation matcher compares the viewer tag generated using the real-time metadata corresponding to the viewer of the viewer terminal with the person information of the object tags stored in the storage, retrieves one or more object tags matching the viewer tag according to the comparison, and further comprises the same in the viewer relationship information in the step (g).

24. The method of claim 23, wherein the viewer-relational video producer preferentially selects one or more person object images associated with the real-time metadata from among the viewer relationship information and produces the viewer-relational video by further including the one or more preferentially selected person object images in the step (h).

* * * * *